(12) United States Patent
Zehnder et al.

(10) Patent No.: US 8,336,702 B2
(45) Date of Patent: Dec. 25, 2012

(54) REVERSIBLE TENSIONING DEVICE, AS FOR A CONVEYOR

(75) Inventors: Adam Zehnder, Emmaus, PA (US); George T. Mott, Alburtis, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 390 days.

(21) Appl. No.: 12/643,271

(22) Filed: Dec. 21, 2009

(65) Prior Publication Data

US 2010/0270127 A1 Oct. 28, 2010

Related U.S. Application Data

(60) Provisional application No. 61/172,961, filed on Apr. 27, 2009.

(51) Int. Cl.
*B65G 45/16* (2006.01)
(52) U.S. Cl. ...................................................... 198/409
(58) Field of Classification Search .................... 198/499
See application file for complete search history.

(56) References Cited

U.S. PATENT DOCUMENTS

| | | | | |
|---|---|---|---|---|
| 3,315,794 | A | * | 4/1967 | Ellington .................... 198/499 |
| 3,952,864 | A | | 4/1976 | Schlagel |
| 4,036,351 | A | * | 7/1977 | Reiter ......................... 198/499 |
| 4,249,650 | A | * | 2/1981 | Stahura ....................... 198/499 |
| 4,533,036 | A | | 8/1985 | Gordon |
| 4,598,823 | A | | 7/1986 | Swinderman |
| 4,664,250 | A | | 5/1987 | Jakobs |
| 4,754,868 | A | | 7/1988 | Hughes et al. |
| 4,836,356 | A | | 6/1989 | Mukai et al. |
| 4,838,409 | A | | 6/1989 | Rappen |
| 4,925,434 | A | | 5/1990 | Swinderman et al. |
| 4,995,851 | A | | 2/1991 | Taylor et al. |
| 5,016,746 | A | | 5/1991 | Gibbs |
| 5,201,402 | A | | 4/1993 | Mott |
| 5,222,589 | A | | 6/1993 | Gordon |
| 5,378,202 | A | | 1/1995 | Swinderman |
| 5,657,853 | A | * | 8/1997 | Pennino ...................... 198/499 |
| 5,725,083 | A | | 3/1998 | Archer |
| 5,799,776 | A | | 9/1998 | Dolan |
| 5,887,702 | A | | 3/1999 | Mott |
| 5,975,281 | A | | 11/1999 | Yoshizako et al. |
| 5,992,614 | A | | 11/1999 | Mott |
| 6,003,657 | A | | 12/1999 | Mott |

(Continued)

OTHER PUBLICATIONS

Patent Cooperation Treaty, "International Search Report", PCT/US2009/069189, Aug. 13, 2010, 3 pages.

(Continued)

*Primary Examiner* — Mark A Deuble
(74) *Attorney, Agent, or Firm* — Ceasar, Rivise, Bernstein, Cohen & Pokotilow, Ltd.

(57) ABSTRACT

A tensioner for applying force to a device to be tensioned is configurable for applying force in different directions and comprises: a mounting plate having a guide; a slidable member slidable relative to the guide of the mounting plate for receiving a support for a device to be tensioned; a spring for being coupled to the mounting plate and to the slidable member, wherein the spring urges the slidable member in one direction when coupled to the mounting plate and to the slidable member in a first configuration and urges the slidable member in an opposite direction when coupled to the mounting plate and to the slidable member in a second configuration. The tensioner configurations enable the tensioner either to pull or to push the support for the device to be tensioned.

24 Claims, 17 Drawing Sheets

(PUSHING)

(PULLING)

U.S. PATENT DOCUMENTS

| | | | | |
|---|---|---|---|---|
| 6,041,913 | A * | 3/2000 | Dolan | 198/499 |
| 6,056,112 | A | 5/2000 | Wiggins | |
| 6,152,290 | A | 11/2000 | Mott | |
| 6,315,105 | B1 | 11/2001 | Gibbs et al. | |
| 6,874,616 | B2 * | 4/2005 | DeVries et al. | 198/499 |
| 6,948,609 | B2 * | 9/2005 | Finger et al. | 198/499 |
| 7,083,040 | B2 * | 8/2006 | Finger et al. | 198/499 |
| 7,093,706 | B2 * | 8/2006 | DeVries et al. | 198/499 |
| 2004/0112716 | A1 | 6/2004 | Devries et al. | |
| 2006/0108201 | A1 | 5/2006 | Swinderman | |
| 2010/0000842 | A1 * | 1/2010 | DeVries et al. | 198/499 |
| 2010/0116621 | A1 * | 5/2010 | DeVries | 198/499 |

OTHER PUBLICATIONS

FLEXCO, "Belt Conveyer Products—Product Handbook", Jan. 2008, cover and pp. 58, 72, 67 and 87.

ASGCO, "ASGCO Primary Belt Cleaners", printed Mar. 18, 2010, 15 pages, www.asqco.com/primary_cleaners.asp.

ASGCO, "ASGCO Secondary Belt Cleaners", printed Mar. 18, 2010, 7 pages, www.asgco.com/secondary_cleaners.asp.

ASGCO, "ASGCO Tensioning Systems", printed Mar. 18, 2010, 8 pages, www.asgco.com/tensioning.asp.

ASGCO, "Mini-Skalper Primary Belt Cleaner", © 1999, 1 Page.

ASGCO, "Excalibur Light Weight Cleaner", © 2000, 1 Page.

ASGCO, "Key Features of the Excalibur Belt Cleaning System", date prior to filing date (unknown), 2 Pages.

ASGCO, "Excalibur Belt Cleaning System—Installation Operation & Maintenance Manual", Form No. 1188-8/00, 2000, 8 Pages.

Martin Engineering, "Martin Piglet—Belt Cleaner and Tensioners Operator's Manual", M3215-6/99, 1999, 36 Pages.

McMaster-Carr, "Clamping Knobs", date prior to filing date (unknown), pp. 1864 & 1865.

Arch, "Gordon Saber Belt Cleaners, Secondary Conveyor Belt Cleaner and Mini Saber", © 1999, 4 Pages, http://www.archenv.com/products/belt_cleaners/ . . . .

Arch, "Saber Primary Conveyor Belt Cleaner, Mini Saber and Saber", © 2001, 6 Pages, www.aeec.com/products/belt_cleaners/ . . . .

Martin Engineering, "Piglet Pre-Cleaner and Secondary Cleaner", Printed Feb. 9, 2000, 2 Pages, http://www.martin-eng.com/cgi-bin/entropy.cgi.

Martin Engineering, "Technical Data Sheet, Piglet Belt Cleaners", Form No. L3370-08-12/97, © 1997, 2 Pages.

Martin Engineering, "Piglet Pre-Cleaner and Secondary Cleaner", © 2000, 2 Pages http://www.martin-eng.com/cgi-bin/entropy.cgi?$template=cgi-shl/nprdpage.htm&RID=. . . .

Baking Industry Sanitation Standards Committee, "Sanitation Standards for the Design and Construction of Bakery Equipment and Machinery", effective Jan. 1, 1998, 11 Pages, www.bissc.org/baking.htm.

Patent Cooperation Treaty, "International Search Report", Int'l Appl. No. PCT/US2001/09000, May 9, 2001, 3 pages.

* cited by examiner (PUSHING)

SECTION A-A (PULLING)

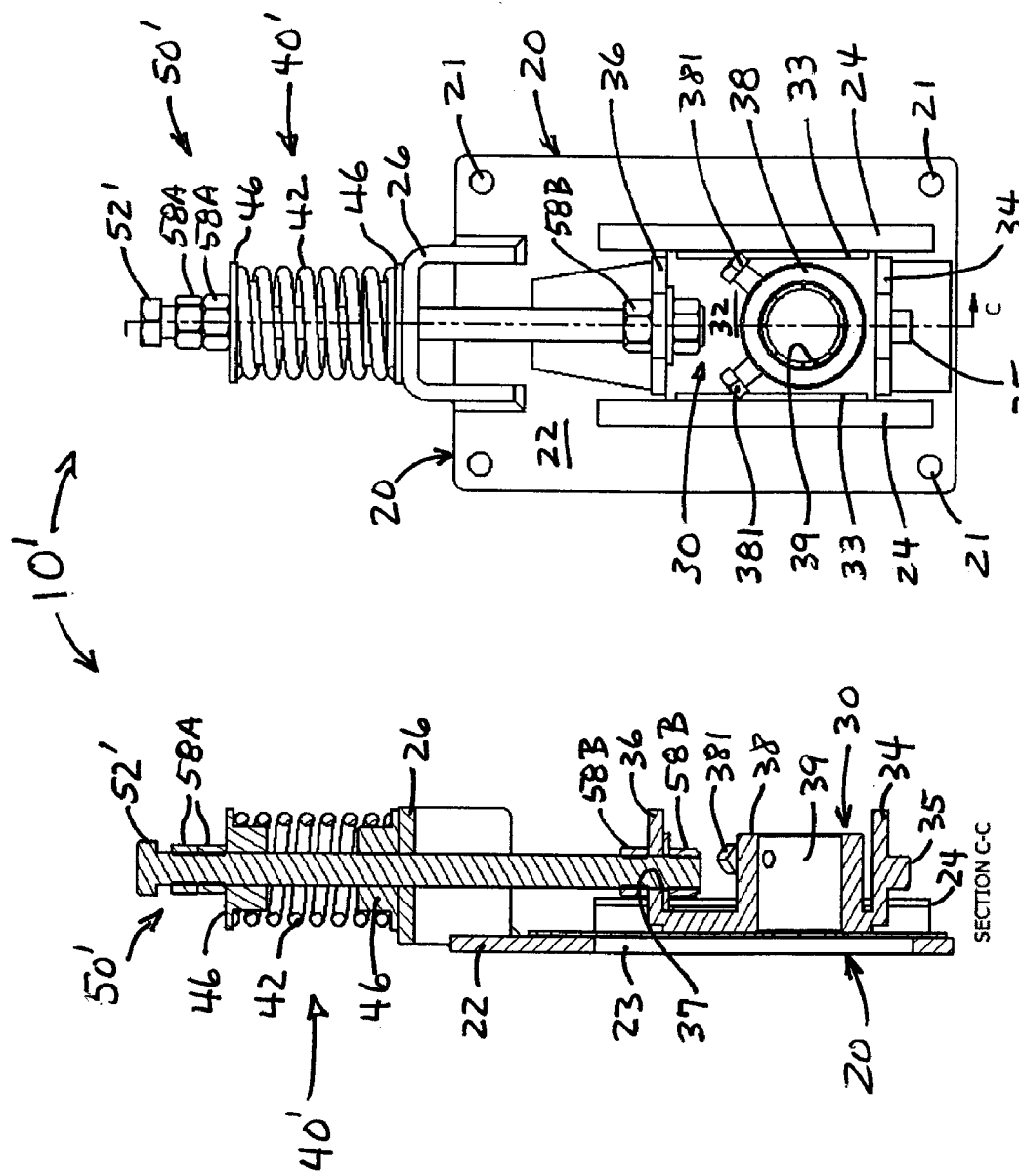

REVERSIBLE TENSIONING DEVICE, AS FOR A CONVEYOR

This application claims the benefit of U.S. Provisional Patent Application No. 61/172,961 filed on Apr. 27, 2009 and entitled "REVERSIBLE TENSIONING DEVICE, AS FOR A CONVEYOR" which is hereby incorporated herein by reference in its entirety.

The present invention relates to a tensioning device for providing a force or pressure as for urging a scraper or other member against a conveyor.

Conventional endless belt conveyors typically have several scraper assemblies disposed to remove deposits and build up from the carrying surface of the conveyor belt. It is necessary to remove deposits and build up of the material carried from the carrying surface of the conveyor to prevent material from being carried back along the return side of the conveyor belt. If such excess material is not removed from the conveyor, it can build up on the conveyor belt and structure, can cause safety problems, can cause damage to return idlers and other conveyor elements, and the like. Such conveyors typically employ an "endless" belt or the like that may include one or more sections that are joined to form an endless belt, and the belt may be of any length, width and thickness as might be required in a given application, and may be solid or may have openings or holes therethrough as might be desired for a given application.

Conveyors commonly have a scraper or scraper assembly, commonly referred to as a primary scraper or primary scraper assembly, located at or near the head pulley to clean the conveyor of the material carried as the conveyor begins its return travel, and may also have another scraper or scraper assembly, commonly referred to as a secondary scraper or secondary scraper assembly, located to contact the conveyor after the conveyor leaves contact with the head pulley. Tensioning devices are commonly provided for the primary scraper and for the secondary scraper of a endless conveyor system.

A common type of scraper or scraper assembly comprises one or more scraper blades extending transversely across the conveyor, i.e. transverse to the direction of motion of the conveyor. These blades are commonly mounted on a transverse support shaft that is usually attached to the structure of the conveying system by a tensioning device that allows the support shaft to travel closer to and farther from of the support shaft while applying a force or pressure for urging the scraper blade toward the conveyor. The travel of the support shaft allows for the scraper blades to move and follow movement of the surface of the conveyor (e.g., movement that is in a direction generally perpendicular to its direction of motion) while maintaining contact pressure of the scraper blades against the surface of the conveyor. The tensioning device typically allows the force or pressure applied to the scraper blades to be adjusted approximately to a desired level or value.

During the installation and use of the prior type of scraper blade assemblies, the support shaft is locked into a vertical location for applying a predetermined contact force or pressure between the scraper blade and the belt surface. As the scraper blade wears down the contact force or pressure it exerts against the surface of the belt steadily decreases, therefore reducing the cleaning efficiency of the scraper blade assembly. Over the useful life of the scraper blade, the support shaft must be adjusted toward the surface of the conveyor belt so as to maintain the desired contact force or pressure of the scraper blade against the belt surface, to achieve consistent cleaning.

The cleaning efficiency of the scraper assembly is highly dependent upon the magnitude of the force (pressure) exerted by the scraper blade against the belt surface. If the contacting force (pressure) is too high, the blade will wear at a faster rate and so will become worn out and in need of replacement prematurely; if the contacting force (pressure) is too low, the blade will not efficiently clean the belt surface. The ability of the tensioner to maintain an optimum or desired contacting force between the scraper blade and the belt largely determines how effective the scraper blade assembly will be.

It is often awkward and/or difficult to install scraper blade assemblies on endless conveyor systems because the systems and structures are different in each installation, because drive trains are in the way, because access structure and/or walkways are in the way or are not in a useful location, and so forth. Not being able to mount the scraper blade in the desired location can lead to reduced scraping efficiency if the scraping device is installed other than in the desired location on the conveyor system. Setting and/or maintaining a desired tensioning of the scraper blade against the conveyor can become difficult, or even impossible, if the tensioning unit is not mounted in the correct location relative to the conveyor.

Accordingly, there is a need for a tensioning arrangement that can avoid or at least mitigate the shortcomings of prior art tensioners. A tensioning arrangement that can be assembled in different configurations is seen to be more readily utilizable with conveyors and with scrapers of differing configurations, and so is desirable.

According to the present arrangement, a tensioner for applying force to a device to be tensioned is configurable for applying force in different directions and comprises: a mounting plate having a guide; a slidable member slidable relative to the guide of the mounting plate for receiving a support for a device to be tensioned; a spring for being coupled to the mounting plate and to the slidable member, wherein the spring urges the slidable member in one direction when coupled to the mounting plate and to the slidable member in a first configuration and urges the slidable member in an opposite direction when coupled to the mounting plate and to the slidable member in a second configuration.

The tensioner configurations enable the tensioner either to pull or to push the support for the device to be tensioned.

BRIEF DESCRIPTION OF THE DRAWING

FIG. 14 includes FIG. 14A which is a plan view of the example pulling tensioner of FIG. 13 and FIG. 14B which is a longitudinal cross-sectional view thereof.

Figure 1:
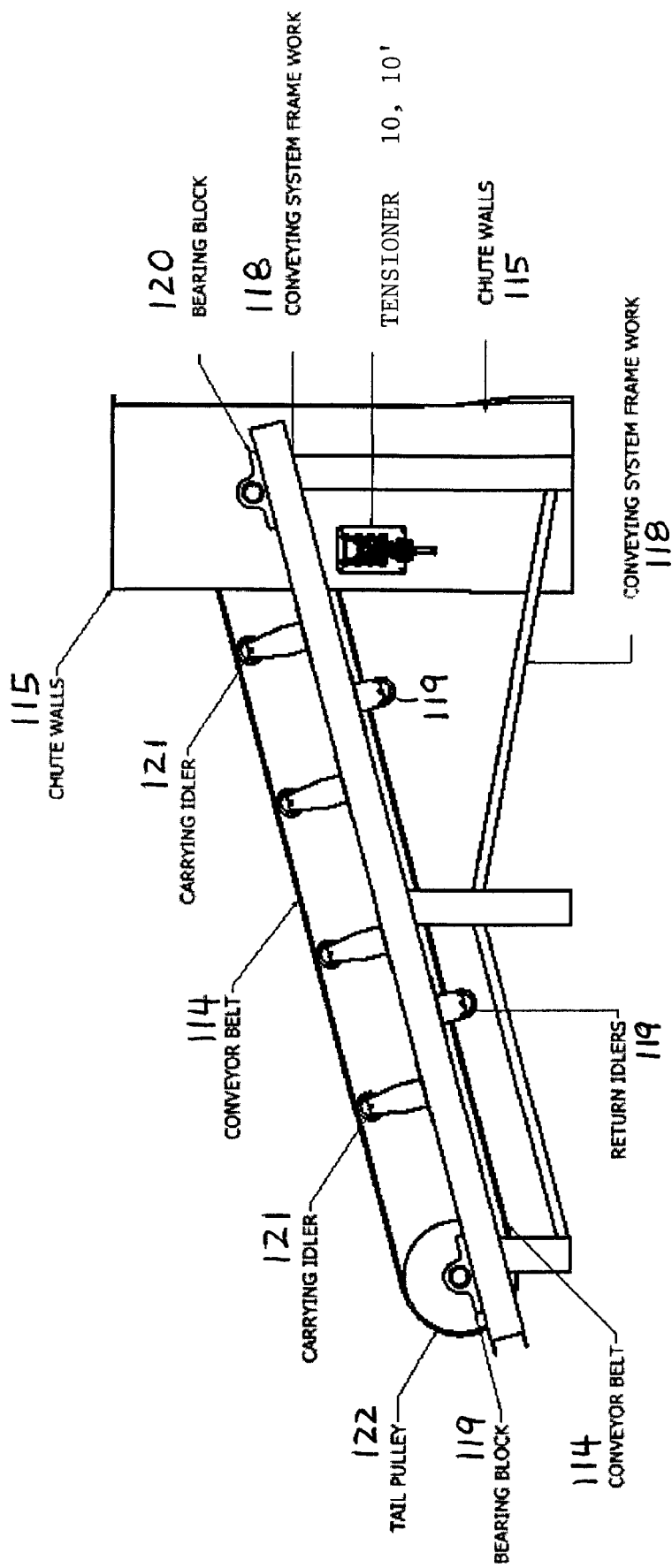
FIG. 1 is a side elevation view of an example conveying system in and with which a tensioner according to the present arrangement may be employed.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DETAILED DESCRIPTION OF THE PREFERRED EMBODIMENT

Figure 2:
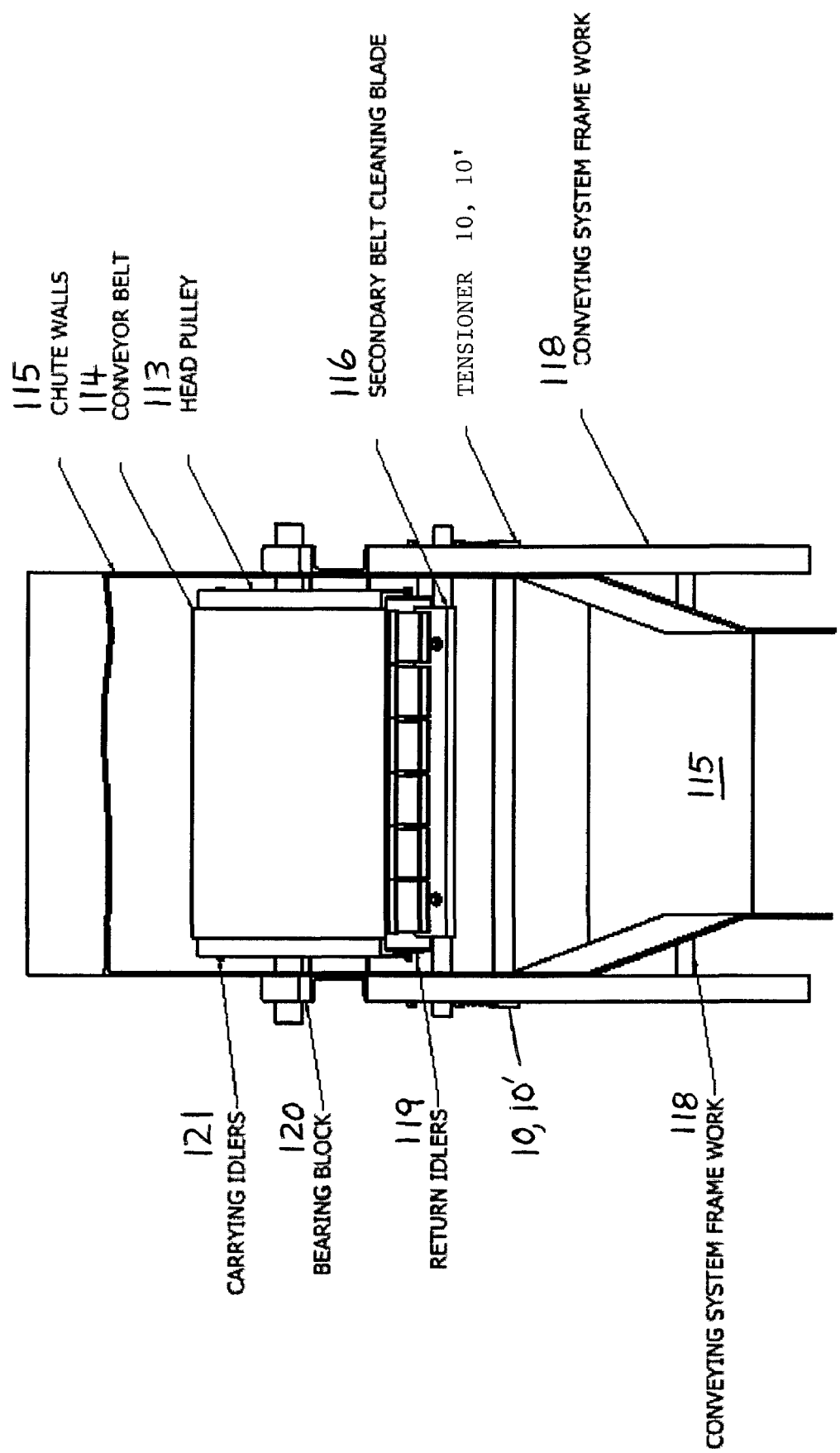
FIG. 2 is an end elevation view (partially cut away) of an example conveying system in and with which the tensioner according to the present arrangement may be employed.
Figure 3:
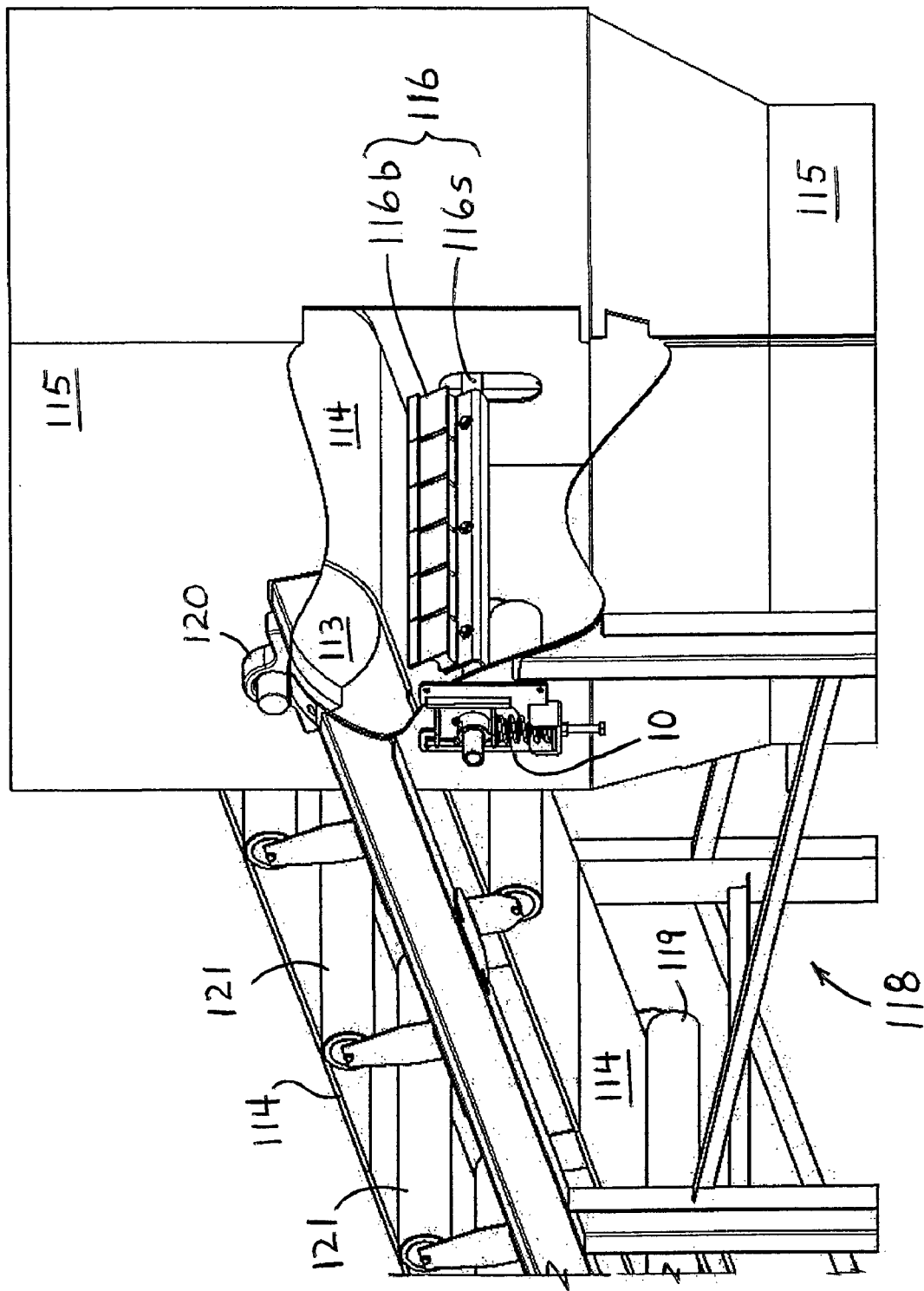
FIG. 3 is an isometric elevation view (partially cut away) of an example conveying system in and with which the tensioner according to the present arrangement may be employed.

FIG. 1 is a side elevation view, FIG. 2 is an end elevation view (partially cut away), and FIG. 3 is an isometric elevation view (partially cut away), of an example conveying system 100 in and with which the tensioner 10, 10' according to the present arrangement may be employed. Conveyor 100 includes a conveyor belt 114 that travels around tail pulley 122 to carry material deposited on belt 114 to tail pulley 122 where it is deposited into chute 115. Conveyor 100 is supported by structure/frame 118 which supports bearings 118, 119 on which head and pail pulleys 118, 122, respectively, are rotatably mounted. Carrying idler rollers (idlers) 121 support the upper portion of conveyor belt 114 and return idler rollers support the lower portion of belt 114.

Tensioner 10, 10' is typically supported on the walls of chute 115 and/or on structure/frame 118. A belt cleaning blade 116 is mounted so as to contact conveyor belt 114 after it passes over head pulley 113, thereby to mechanically remove material that has not fallen off of belt 114 into chute 115 under the influence of gravity. Blade 116 typically includes a cleaning blade 116b that is mounted on and supported by a support 116s, typically a support rod or bar 116s, to which force is applied to press blade 116b against conveyor belt 114. Tensioner 10, 10' may be according to the arrangement described herein and may be assembled and employed in a pushing configuration 10 or in a pulling configuration 10', as may be necessary or convenient for a particular configuration of chute 115 and/or structure/frame 118.

The present arrangement relates to a tensioning device 10, 10' for adjusting the contact pressure or force of a scraper blade or other implement on the surface of an endless conveyor, e.g., a conveyor belt. The tensioning device 10, 10' includes a compression spring, which is compressed using a threaded member that is perched on a mounting bracket that can be assembled in two different configurations that allow the tensioning device 10, 10' to act in two different tensioning modes: in a pushing tensioning mode and in a pulling tensioning mode. Two different modes (e.g., FIGS. 10-12 & 13-15) facilitate mounting of the tensioner 10, 10' on a variety of different endless conveyor systems 100 (e.g., FIGS. 1-3). In either tensioning mode the compression spring applies force that allows the scraper blade or other implement to maintain contact with a conveyor.

The present arrangement is able to compensate for variations in conveyor structure 115, 118 design by accommodating two tensioning modes or configurations, a push-up and a pull-up mode or configuration, also referred to as a pushing and a pulling mode or configuration, respectively. The two tensioning modes are achievable using a mounting bracket that can be utilized in two different mounting configurations in accordance with the arrangement of the elements of the tensioner 10, 10' as assembled in a particular instance.

The push-up or pushing mode of tensioning allows the majority of the bracket and tensioning parts to be located on the conveyor structure 115, 118 below the bottom edge of the belt or other conveyor 114 when used for tensioning a secondary scraper or cleaner 116, which allows for consistent tensioning even when the conveyor structure blocks access proximate the top of the belt or other conveyor. The location would be above the top edge of the belt or other conveyor were the tensioner to be used for tensioning a primary scraper or cleaner.

The pull-up or pulling mode of tensioning allows the majority of the bracket and tensioning parts to be located on the conveyor structure above the top edge of the belt or other conveyor when used for tensioning a secondary scraper or cleaner, which allows for consistent tensioning even when conveyor structure blocks access proximate the bottom of the belt or other conveyor. The location would be below the top edge of the belt or other conveyor were the tensioner to be used for tensioning a primary scraper or cleaner.

For the situation in which the structure may be different on opposite sides of the conveyor, the present arrangement is also capable of being mounted in the push-up or pushing mode at one side of the conveyor and in the pull-up or pulling mode at the other side of the conveyor, or vise versa.

The present arrangement preferably employs a compression spring screw tensioning unit to adjust contact force (pressure) and to maintain a substantially constant contact force (pressure) of the scraper blade against the conveyor, and to mitigate the effect of system vibrations, surges, belt splices and blade wear on that force (pressure).

It is noted that while the tensioning device or tensioner 10, 10' applies a force to the blade support, the scraper blade (or blades) has a certain area that is in contact with the conveyor and so the result of the maintaining a given tensioning force is generally to maintain a given contact pressure (force per unit of area) between the scraper blade(s) and the conveyor. However, if the scraper blade is not of uniform cross-sectional size and shape, then the area of the scraper blade that is in contact with the conveyor will change as the scraper blade wears.

Nevertheless, herein the term force will generally be used and should be read as including pressure.

It is also noted that while the tensioner 10, 10' is described in relation to certain directions such as "up" or "down" as might be appropriate in relation to a particular example conveyor, e.g., where the conveyor is generally horizontal and so the blade would be urged generally vertically towards the conveyor surface, such directions are only examples and the present tensioner may be utilized in any orientation and for applying force in any desired direction, e.g., for urging the support generally towards the conveyor, whether arranged in a pushing or in a pulling configuration.

In a generic sense, the tensioner arrangement 10, 10' described herein may be employed in a pushing configuration 10 or in a pulling configuration 10' as may be appropriate to a given application for the tensioner 10, 10'. The tensioning direction, i.e. either pulling or pushing, obtains from the manner in which the elements of tensioner 10, 10' are arranged and assembled in a given instance to apply force to the support for a scraper blade, as is described below.

A reversible tensioner 10, 10' for a conveyor belt scraping or cleaning device can be oriented or assembled with the spring assembly 40, 40' including spring 42 located above the body element 30 in the case of the tensioner 10' or below the body element 30 in the case of the tensioner 10, depending on the structure and/or configuration of the conveyor with which the scraper or cleaner is being installed. Scraper and cleaner are used interchangeably and equivalently herein even though they may have a somewhat different meaning or connotation to those skilled in the art, and are intended to encompass any device that is pressed against a moving belt or other conveyor.

The principal elements of tensioner 10, 10' will be described individually, followed by a description of tensioner 10 with the elements thereof assembled in the pushing configuration, and followed by a description of tensioner 10' with the elements thereof assembled in the pulling configuration.

Figure 4:
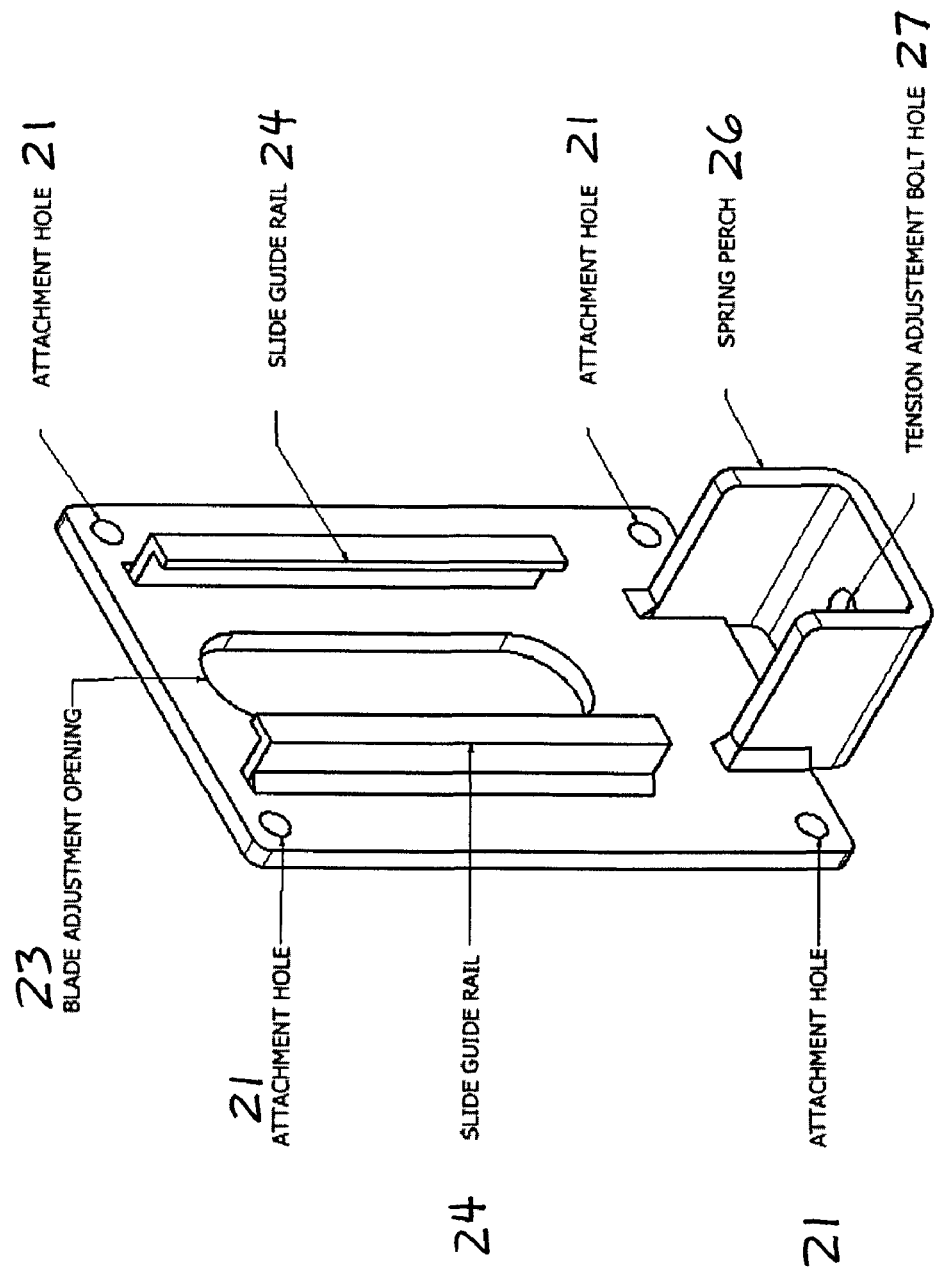
FIG. 4 is an isometric view of an example mounting plate suitable for use in the example tensioner according to the present arrangement.
Figure 5A:
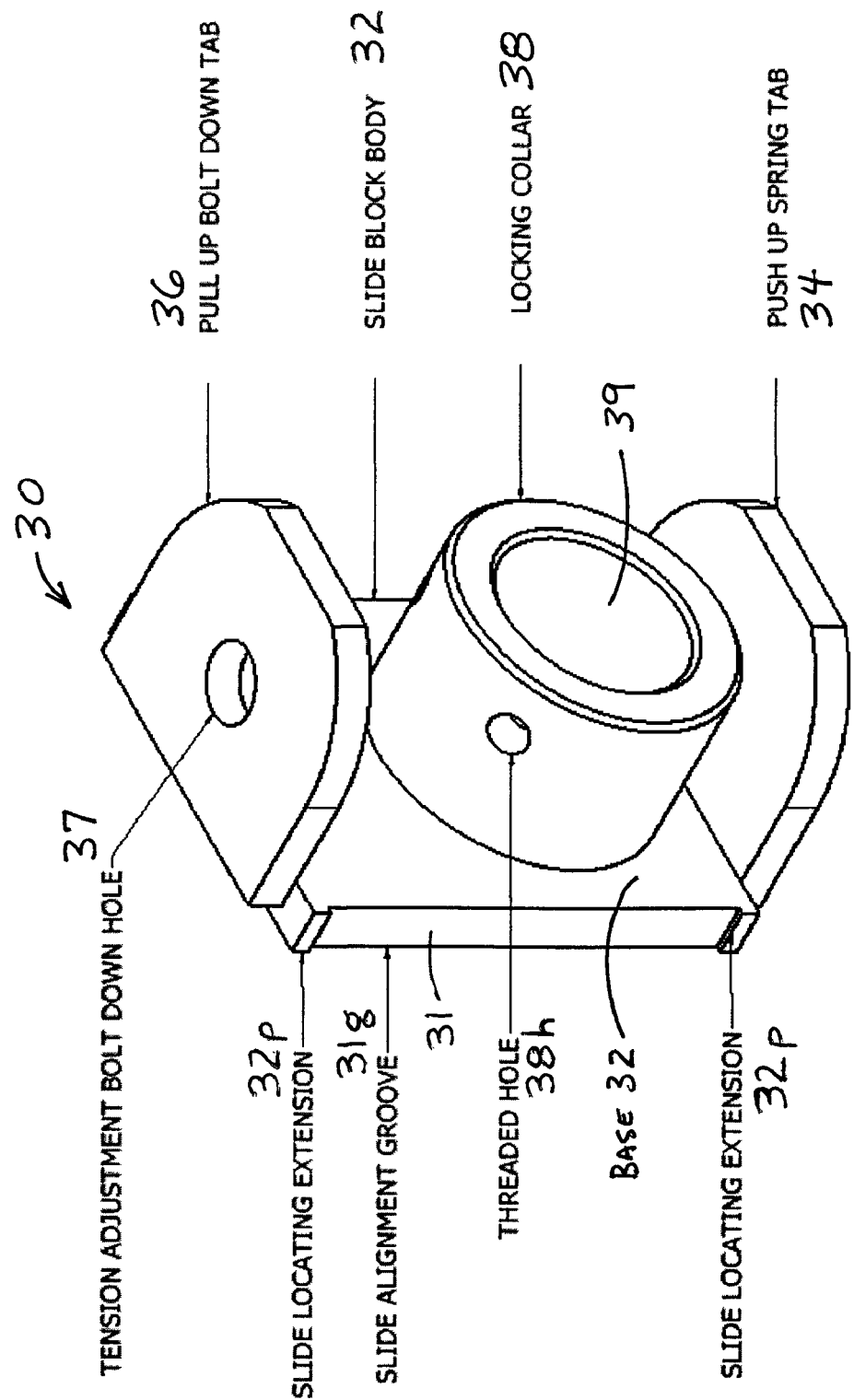
FIGS. 5A and 5B are isometric views of an example slide block suitable for use in the example tensioner according to the present arrangement.
Figure 5B:
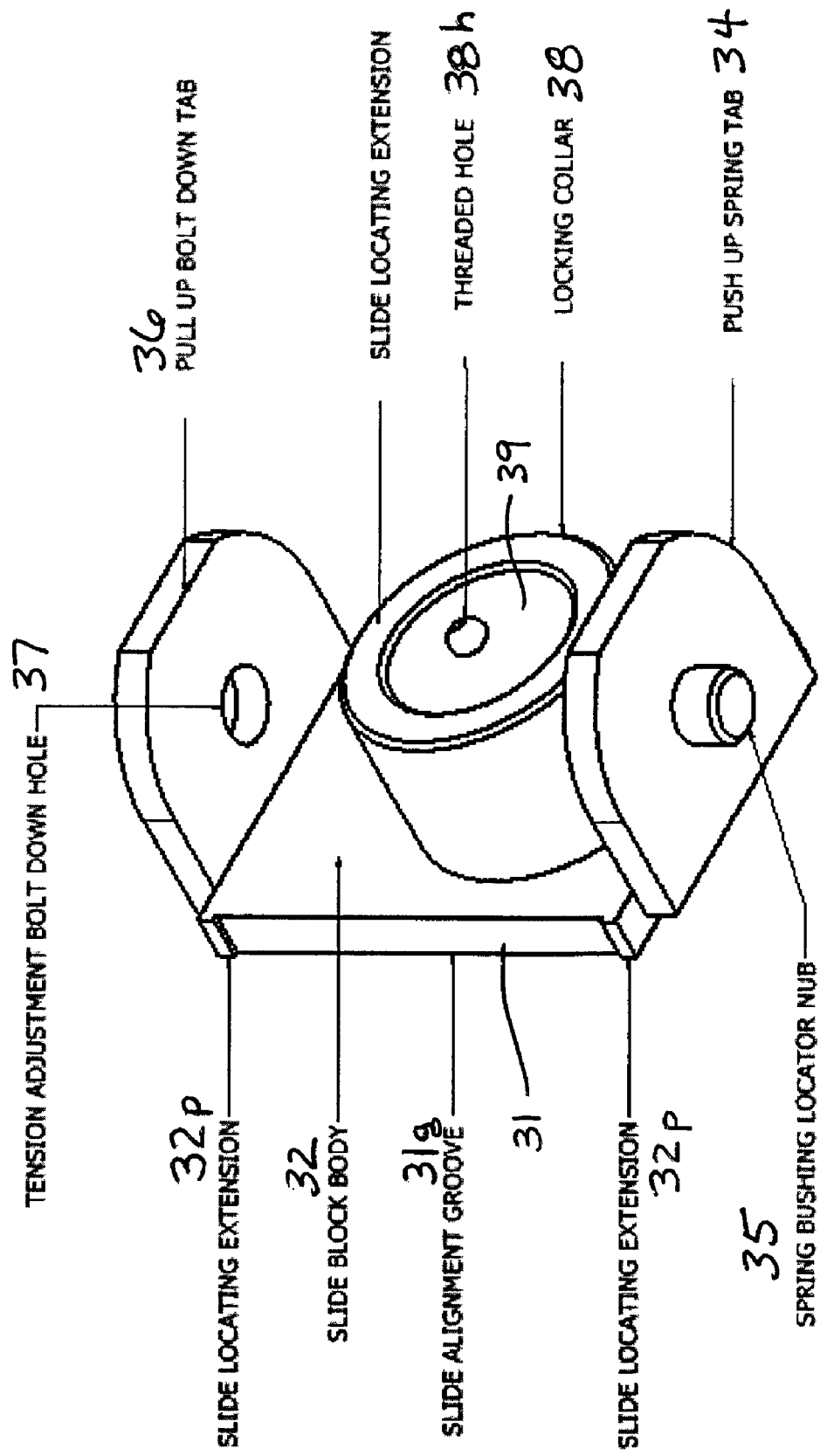
Figure 6:
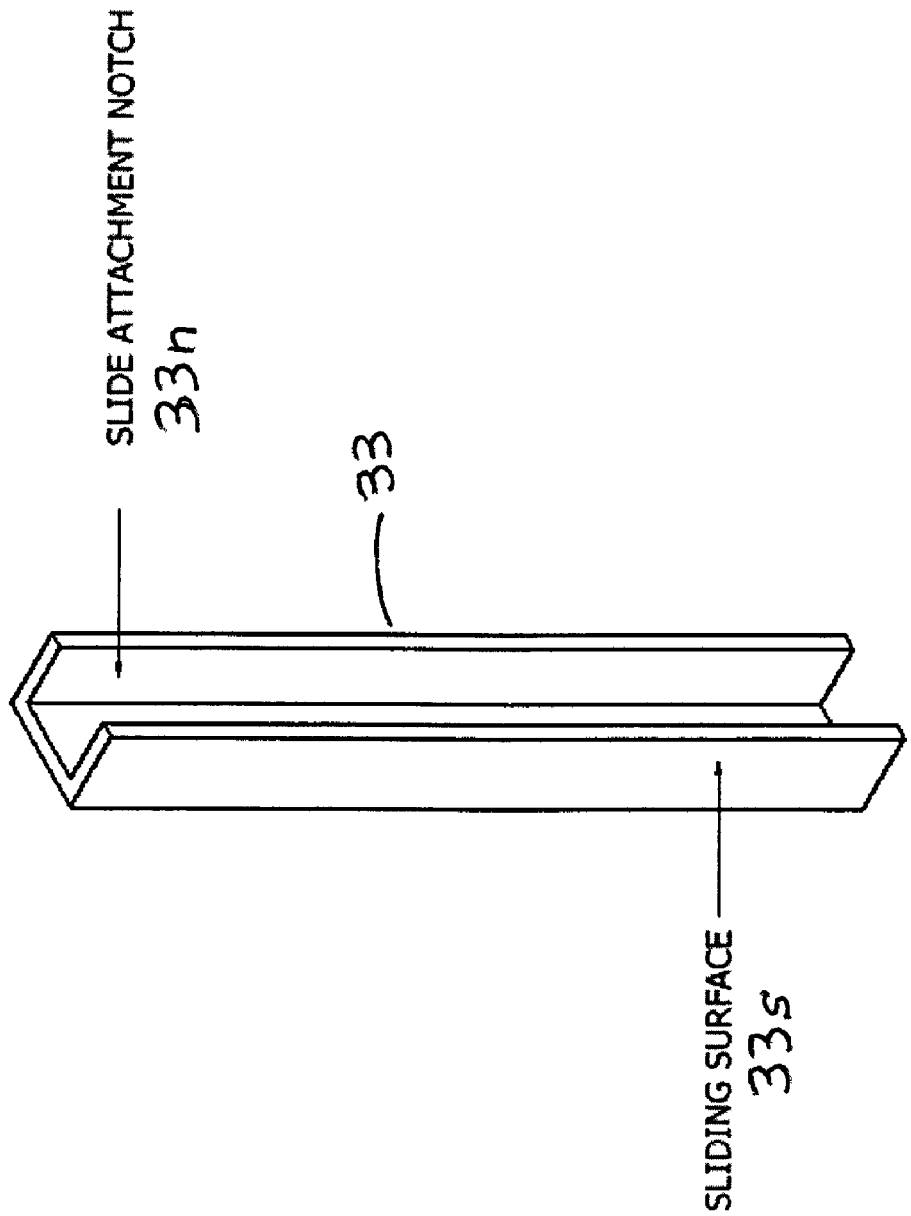
FIG. 6 is an isometric view of an example slide suitable for use in the example tensioner according to the present arrangement.
Figure 7:
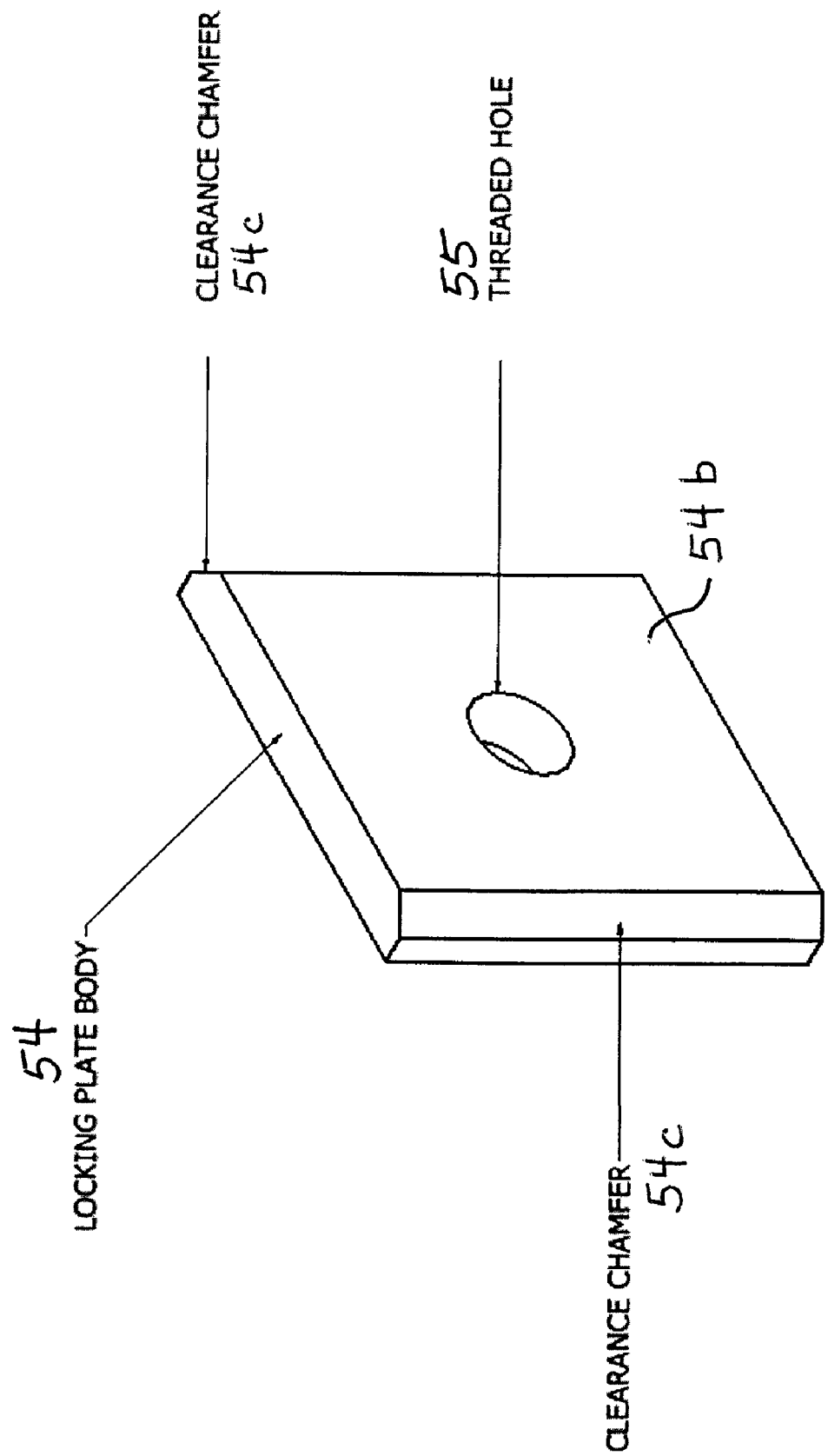
FIG. 7 is an isometric view of an example locking plate suitable for use in the example tensioner according to the present arrangement.
Figure 8:
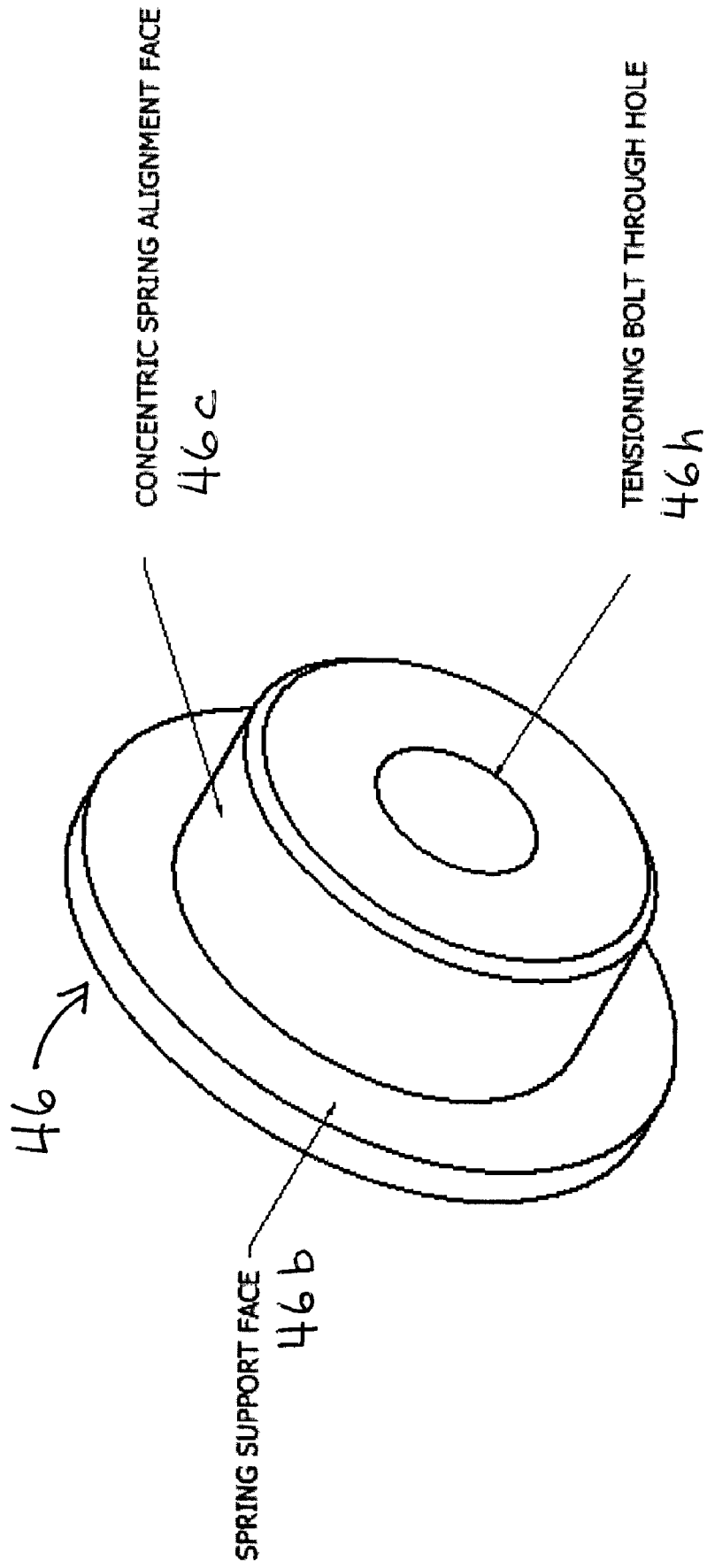
FIG. 8 is an isometric view of an example spring bushing suitable for use in the example tensioner according to the present arrangement.
Figure 9A:
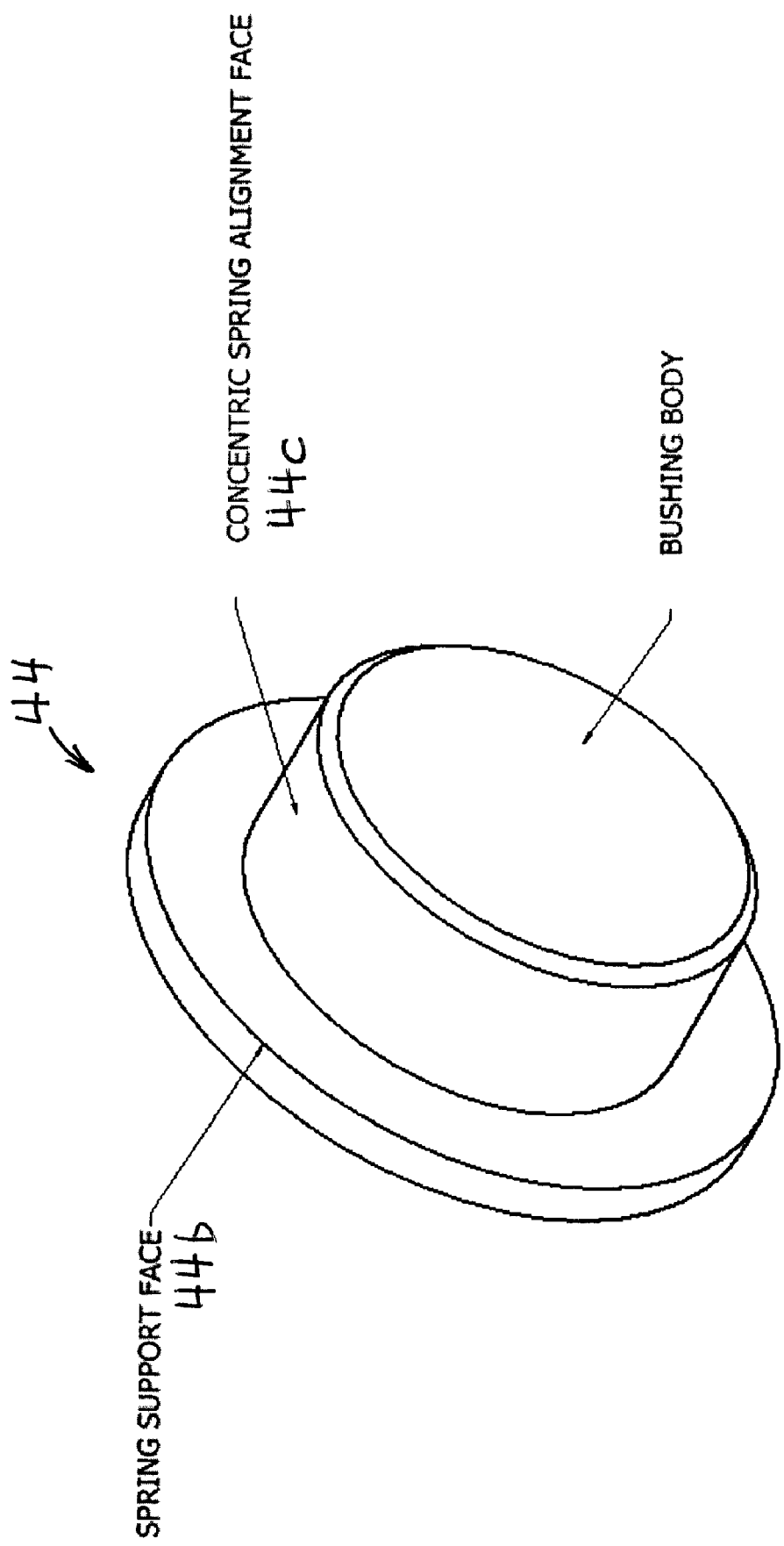
FIGS. 9A and 9B are isometric views of an example pushing bushing suitable for use in the example tensioner according to the present arrangement.
Figure 9B:
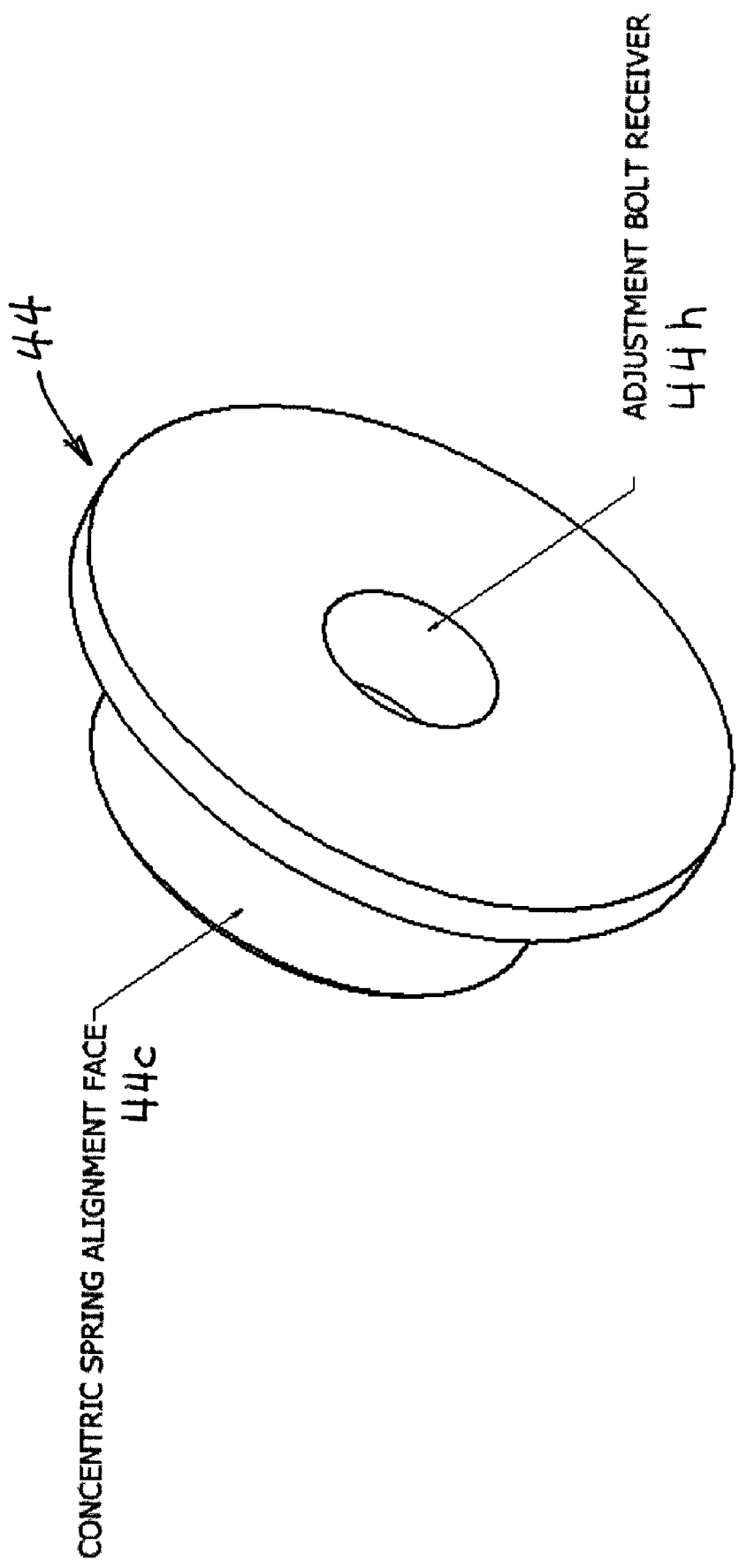

Principal Elements:

FIG. 4 is an isometric view of an example mounting plate 20 suitable for use in the example tensioner 10, 10' according to the present arrangement; FIGS. 5A and 5B are isometric views of an example slide block 30 suitable for use in the example tensioner 10, 10' according to the present arrangement; FIG. 6 is an isometric view of an example slide 33 suitable for use in the example tensioner 10, 10' according to the present arrangement; FIG. 7 is an isometric view of an example locking plate 54 suitable for use in the example tensioner 10, 10' according to the present arrangement; FIG. 8 is an isometric view of an example spring bushing 46 suitable for use in the example tensioner 10, 10' according to the present arrangement; and FIGS. 9A and 9B are isometric views of an example pushing bushing 44 suitable for use in the example tensioner 10, 10' according to the present arrangement.

Mounting plate 20 (e.g., FIG. 4) includes a generally planar base 22 that may be mounted to a conveyor structure or other structure, e.g., by bolts or other fasteners passing through mounting holes 21. Base 22 has a slot 23 therethrough in a direction referred to as the longitudinal direction. A pair of opposing guides 24 are attached to or otherwise part of base 22 of mounting plate 20 so as to provide a pair of generally parallel longitudinal guides near opposing sides of longitudinal slot 23. Typically, each of guides 24 may have a flange oriented inwardly towards slot 23 for defining a channel or channels in which a slidable block 30 may slide in the longitudinal direction. Mounting plate also includes a spring support flange 26 extending therefrom in a location generally longitudinally away from the end of slot 23 and/or guides 24 so as to be in the path of slidable block 30 when slidable block 30 is in the channel defined by guides 24. While spring support flange 26, which may also be referred to as a spring perch 26, may simply be a flat projecting flange having a hole 27 therethrough, it is usually preferred that it include one or more sides so as to define a recess or well into which certain elements will be placed, e.g., to increase the strength of perch 26 or to locate spring 42, or both. As illustrated, flange 26 may be "U"-shaped and so provides two sides in addition to a "side" provided by base 22.

Slidable block or slide block 30 (e.g., FIGS. 5A & 5B) includes a base 32 that fits between opposing guides 24 for sliding therein in the longitudinal direction along base 22, longitudinal slot 23 and guides 24. Slide block 30 preferably includes a first flange 34 at one end of the base 32 thereof and a second flange 36 at the opposing end of base 32 thereof. Flange 34 typically includes an outwardly facing bump or projection 35, e.g., a nub 35 for positioning elements that will be in contact therewith, and flange 36 has a hole 37 therethrough, e.g., for receiving a bolt or other element therethrough, such as a tension adjustment bolt. Flange 34 is also referred to as a push up spring tab 34 and flange 36 is also referred to as a pull up bolt down tab 36.

Slidable member 30 includes a member or receptacle 38, typically a circular collar 38 that is attached to base 32 and that has its bore 39 over a hole in base 32, for receiving therein and/or therethrough a support for a scraper or other device to be tensioned. The hole in base 32 may be omitted where a support is inserted in slide block 30 without passing through base 32 thereof. Collar 38 typically includes one or more threaded holes 38*h* for receiving a securing device 38*l*, e.g., such as one or more set screws or cutting bolts 38*l*, for securing such support within the bore 39 of collar 38 of slide block 30.

Optionally, but preferably, a pair of slides 33 (e.g., FIG. 6) are disposed on the opposing edges 31 of base 32 of slide block 30, which may have a groove or projections or other feature or features for maintaining slides 33 in a desired position relative to base 32 of slide block 30. Slides 33 are typically elongated channels having a generally U-shaped cross-section, thereby to define an interior attachment notch 33*n* and an exterior sliding surface 33*s*. Slides 33 on slide block 30 slide in guides 24 of mounting plate 20, e.g., to reduce friction between mounting plate 20 and slide block 30, so that slide block 30 is more easily slidable in the longitudinal direction of mounting plate 20 in the channel defined by guides 24. Slides 33 are typically of an ultra high molecular weight (UHMW) material, e.g., such as a UHMW polyethylene material, or other suitable material, so as to reduce friction between slide 30 and guides 24 and to be durable, e.g., to resist wear.

Where a slide 33 is employed, slide block 30 preferably has a slide locating feature on one or both of side edges 31 of base 32 thereof for locating the optional slide 33 thereon. For example, such feature may be a slide alignment groove 31*g* that is defined by two slide locating extensions or projections 32*p*, one located at each opposing end of side edge 31. Thus, slide 33 will be constrained to be located on edge 31 between the projections 32*p* and will be maintained on edge 31 in the longitudinal direction by the two projections 32*p* and in the transverse direction by guides 24 of mounting plate 20.

A spring assembly 40, 40' includes a coil spring 42 (e.g., FIGS. 7-9) that is intended to be compressed for tensioner 10 to apply force to a support for tensioning a scraper or cleaner or other element. Various plates, bushings, nuts, bolts, washers and the like (e.g., typically common hardware items) may be employed in assembling spring 42 into a spring assembly 40, 40' for tensioner 10, 10'.

Locking plate 54 (e.g., FIG. 7) has a generally rectangular body 54b that is shaped and sized to be received inside the spring perch 26 of mounting plate 20, which is generally U-shaped to define a generally rectangular base and opposing generally rectangular sides, and not to be rotatable therein, thereby to serve as a nut for a tension adjustment bolt in the pushing configuration of tensioner 10, 10'. Locking plate 54 has a threaded hole 55 through its body 54b so as to serve as a nut and may have chamfers 54c on opposing edges so as to provide clearance for the bend radius of the corners of spring perch 26.

Spring assembly 40 preferably includes bushings at each end of coil spring 42 to assist in locating the ends of spring 42 in a desired position.

Spring bushing 46 (e.g., FIG. 8) which is preferably employed in both the pushing and pulling configurations of tensioner 10, 10' described below, has a generally hat-like shape. The cylindrical hat crown 46c provides a concentric alignment guide for spring 42 and the annular hat brim 46b provides an annular support face therefor. A through hole 46h allows for a tensioning bolt to pass through bushing 46 into the center of spring 42.

Spring bushing 44 (e.g., FIGS. 9A-9B) which is preferably employed in the pushing configuration of tensioner 10, 10' described below, has a generally hat-like shape. The cylindrical hat crown 44c provides a concentric alignment guide for spring 42 and the annular hat brim 44b provides an annular support face therefor. A blind hole 44h allows for a tensioning bolt to bear against bushing 44 and thereby to bear against one end of spring 42, e.g., thereby to exert force against spring 42 for tending to compress spring 42.

Typically, mounting plate 20 is of a steel and guides 24 and spring support flange 26 are welded to a flat plate serving as base 22. Similarly, slide block 30 may be of a steel, and flanges 34, 36 and collar 38 may be welded to a flat plate serving as base 32. Also typically, spring 40 and various plates, bolts and nuts may be of a steel, although bushings 44, 46 may be of steel or of another material, e.g., a UHMW polyethylene material.

The Pushing Configuration

Figure 10:
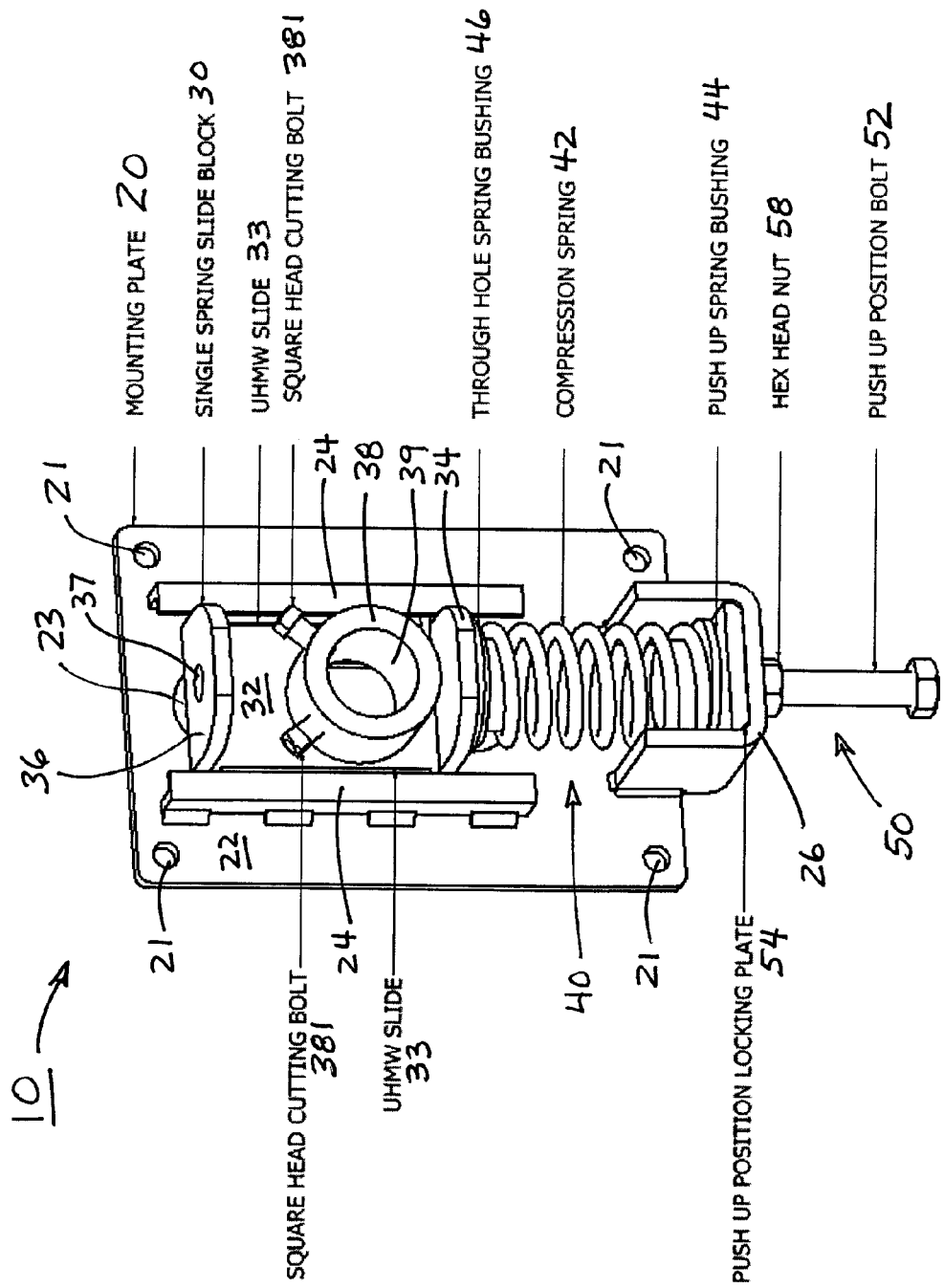
FIG. 10 is an isometric view of an example tensioner according to the present arrangement arranged in a pushing configuration.
Figures 11A, 11B:
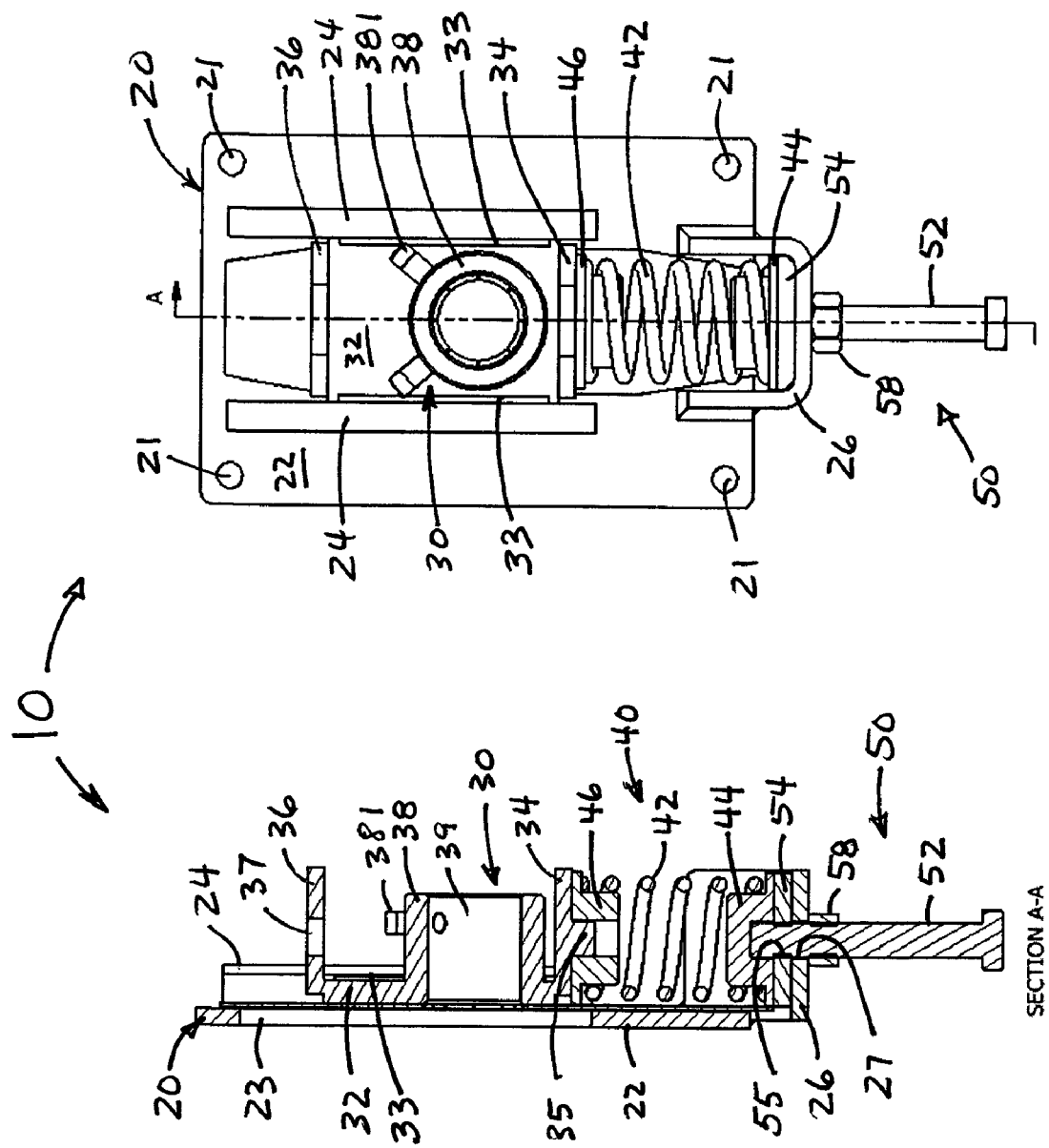
FIG. 11 includes FIG. 11A which is a plan view of the example pushing tensioner of FIG. 10 and FIG. 11B which is a longitudinal cross-sectional view thereof.
Figures 12A, 12B:
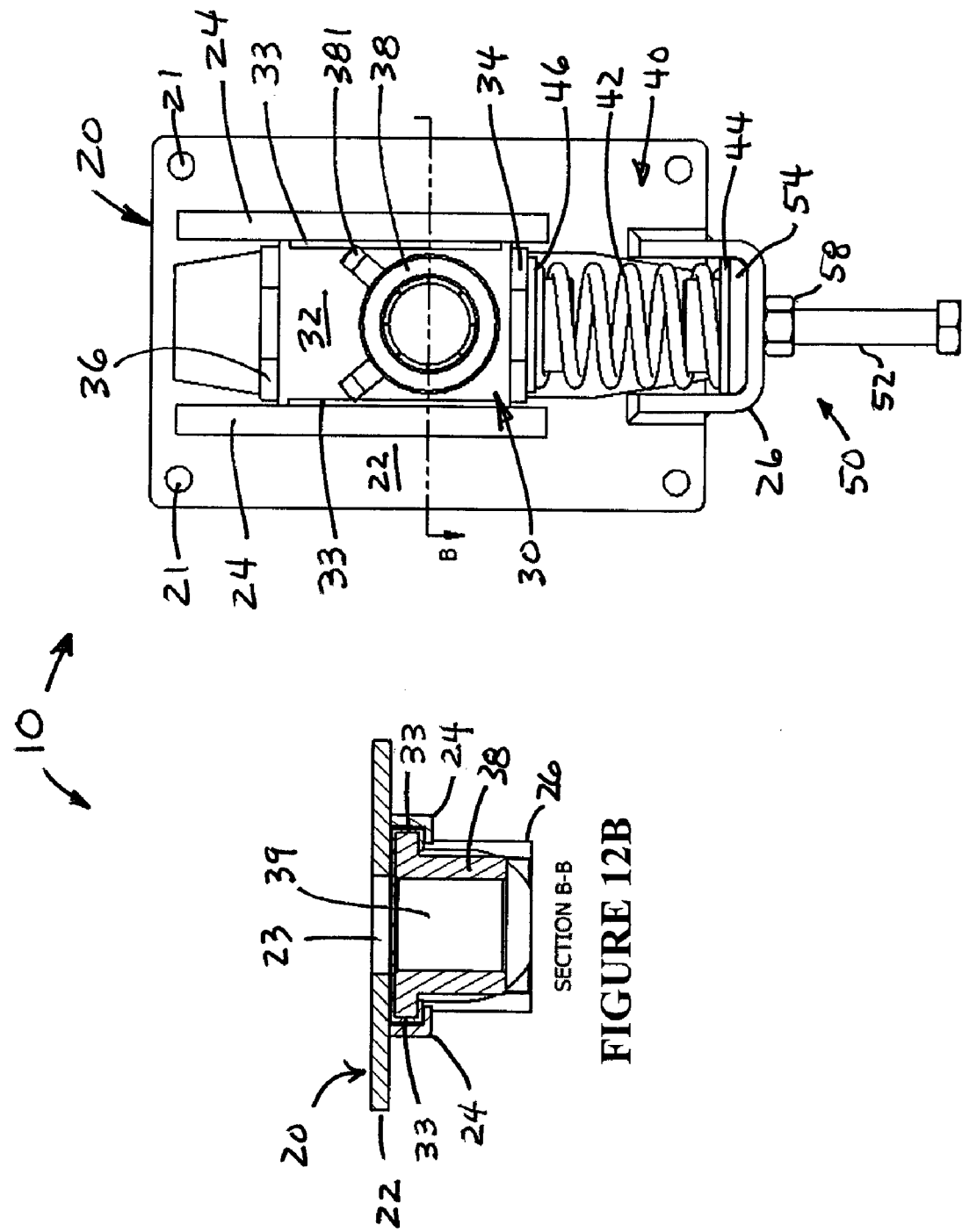
FIG. 12 includes FIG. 12A which is a plan view of the example pushing tensioner of FIG. 10 and FIG. 12B which is a transverse cross-sectional view thereof.

FIG. 10 is an isometric view of an example tensioner 10 according to the present arrangement arranged in a pushing configuration; FIG. 11A is a plan view of the example pushing tensioner 10 of FIG. 10 and FIG. 11B is a longitudinal cross-sectional view thereof; and FIG. 12A is a plan view of the example pushing tensioner 10 of FIG. 10 and FIG. 12B is a transverse cross-sectional view thereof.

The pushing configuration of tensioner 10 is described with reference to FIGS. 10-12 in which the elements thereof are assembled in a configuration for pushing a support for a scraping blade for applying a force thereto to press the scraping blade against a conveyor. The scraping blade may be located relative to the conveyor so as to serve as a primary or as a secondary scraper. Details and alternative views of various elements of tensioner 10 are shown in others of the Figures.

Mounting plate 20 is mounted, e.g., to the conveyor structure or other structure, with the end thereof including spring support flange 26 distal the conveyor, e.g., down for a push-up tensioner configuration. Slide block 30 is slid into the longitudinal channel defined by guides 24 with first flange 34 proximate spring support 26 and with second flange 26 distal spring support 26. Spring assembly 40 is assembled by inserting spring 42 between spring support 26 and first flange 34 with the axis of spring 42 parallel with the longitudinal direction of slot 23 and the sliding direction of slide block 30. Spring bushing 46 is located between first flange 34 and spring 42, and is adjacent first flange 34 so that the projection of first flange 34 is disposed in the through hole of spring bushing 46 and the cylindrical extension of bushing 46 extends into the end of coil spring 42. Between support flange 26 and coil spring 42 are locking plate 54 which is adjacent to support flange 26 and spring bushing 44 which has a blind hole or other recess for receiving a bolt 52 that is threaded into and through the threaded hole 55 of locking plate 54 and has a cylindrical portion that extends into the end of coil spring 42. Bolt 52 is able to move longitudinally in the hole 27 of spring support flange 26, except as constrained by locking plate 54 and nut 58 as described below. As a result, spring 42 is positioned and constrained with its central axis generally parallel to the longitudinal direction of slot 23 for moving and applying force to slide block 30 via first flange 34 thereof.

Bolt assembly 50 includes a bolt 52 that preferably has a locking nut 58 threaded thereon and is itself threaded into threaded hole 55 in locking plate 54 which is disposed against support flange 26 of mounting plate 20. By rotating bolt 52 so that it advances longitudinally through locking plate 54 toward slide block 30, push up spring bushing 44 is advanced towards spring block 30 and coil spring 42 also advances so that slide block 30 also advances longitudinally. With a support for a scraper or other implement through slot 23 of mounting plate 20 and collar 38 of slide block 30, and secured in collar 38 by cutting bolts 38l, the support will also advance until the scraper or implement supported thereby encounters the conveyor at which point the support will cease to advance, so that advancing bolt 52 further will compress coil spring 42 thereby to apply a force to slide block 30, the support and the scraper or implement supported thereby, e.g., against the conveyor.

In this manner spring 42 is coupled between mounting plate 20 and slide block 30 in a first configuration for applying a force therebetween by which a scraper or other implement may be pressed against a conveyor with a desired force.

Nut 58 may be advanced towards support flange 26 to engage flange 26 and lock bolt 52 in a desired position that produces a desired force on the scraper or implement support, thereby to tend to resist the unwanted loosening or tightening of bolt 52, although any other suitable arrangement for locking bolt 52 may be employed.

As the scraper engages a moving conveyor and the splices and other variations in the conveyor cause the support and slide block 30 to move in the longitudinal direction in guides 24 relative to mounting plate 20 which is affixed to structure, and so spring 42 will be compressed and will expand to substantially maintain the desired force, e.g., the force set by advancing bolt 52, for pressing the support and the scraper or other implement thereon towards the conveyor.

The Pulling Configuration

Figure 13:
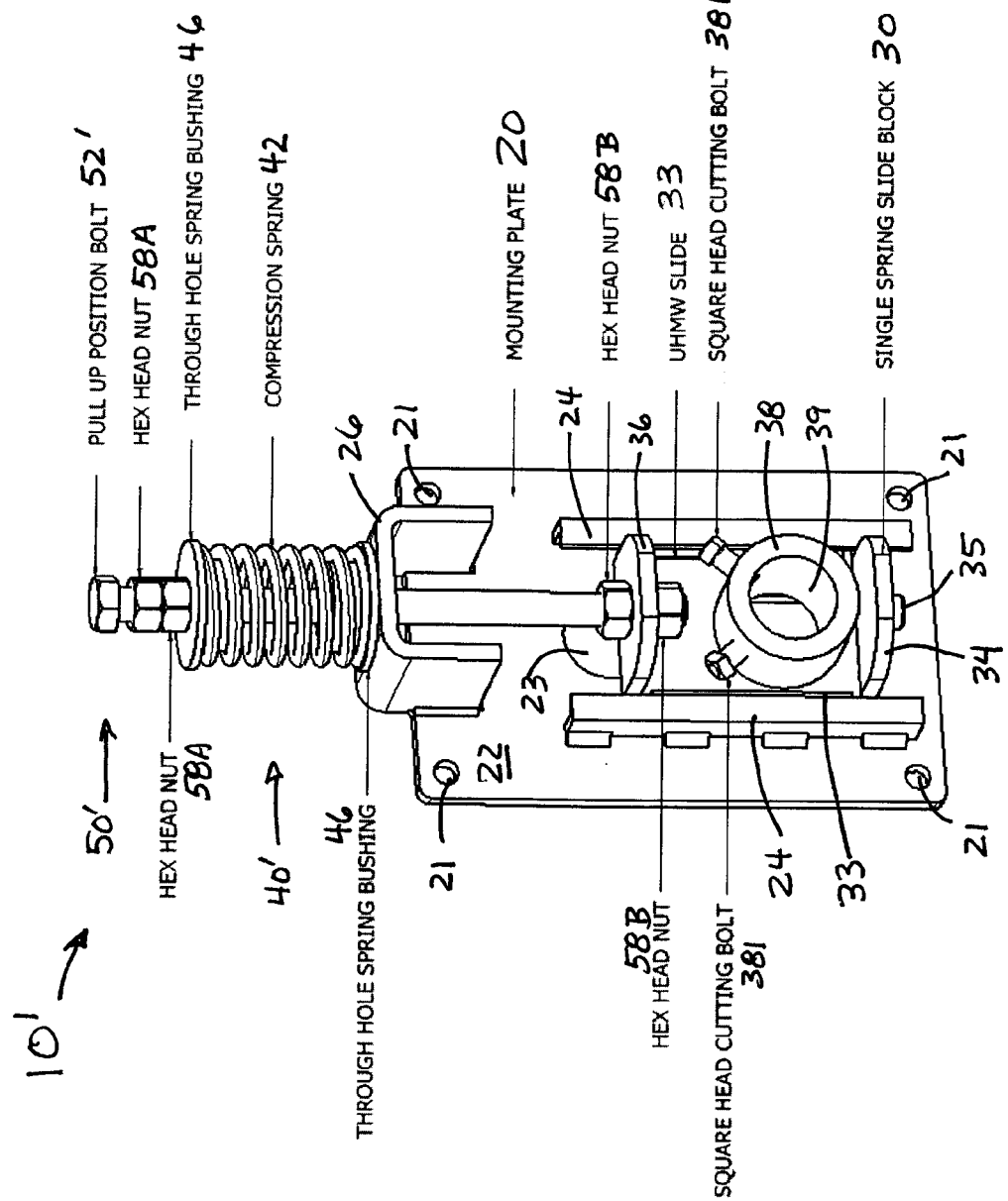
FIG. 13 is an isometric view of an example tensioner according to the present arrangement arranged in a pulling configuration.
Figure 15A:
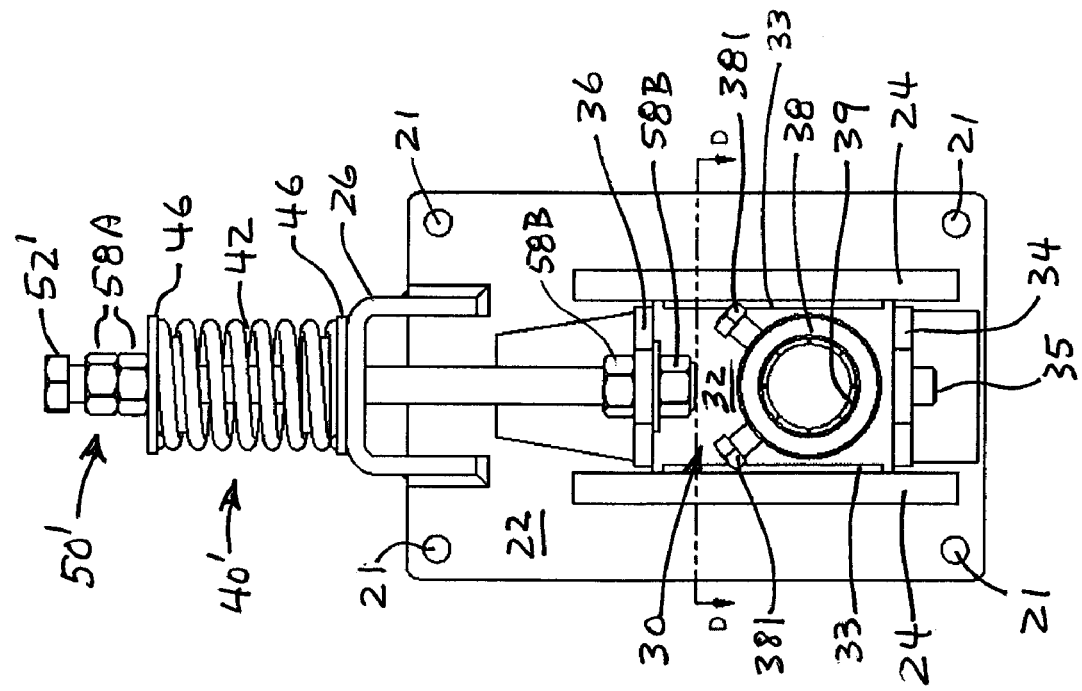
FIG. 15 includes FIG. 15A which is a plan view of the example pushing tensioner of FIG. 10 and FIG. 15B which is a transverse cross-sectional view thereof.
Figure 15B:
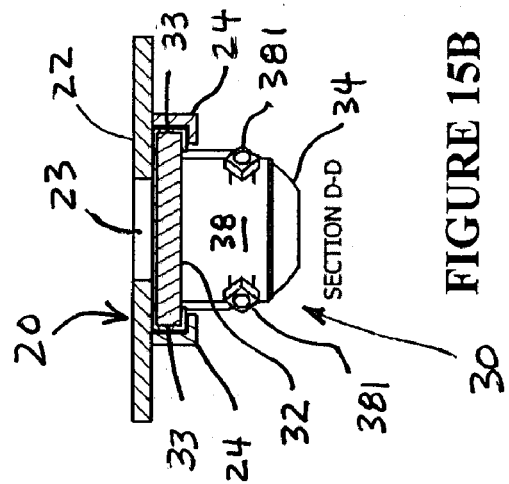

FIG. 13 is an isometric view of an example tensioner 10' according to the present arrangement arranged in a pulling configuration; FIG. 14A is a plan view of the example pulling tensioner 10' of FIG. 13 and FIG. 14B is a longitudinal cross-sectional view thereof; and FIG. 15A is a plan view of the example pulling tensioner 10' of FIG. 10 and FIG. 15B is a transverse cross-sectional view thereof.

The pulling configuration of tensioner 10' is described with reference to FIGS. 13-15 in which the elements thereof are assembled in a configuration for pulling a support for a scraping blade for applying a force thereto to press the scraping blade against a conveyor. The scraping blade may be located relative to the conveyor so as to serve as a primary or as a secondary scraper. Details and alternative views of various elements of tensioner 10' are shown in others of the Figures.

Mounting plate 20 is mounted, e.g., to the conveyor structure or other structure, with the end thereof including spring support flange 26 proximate the conveyor, e.g., up for a pull-up tensioner configuration. Slide block 30 is slid into the longitudinal channel defined by guides 24 with second flange 36 proximate spring support 26 and with first flange 34 distal spring support 26. Spring assembly 40' is assembled with bolt assembly 50' apart from mounting plate 20 and slide block 30.

Bolt assembly 50' is assembled by threading one or more nuts 58A onto bolt 52' and by placing bolt 52' through the hole of spring bushing 46. Coil spring 42 is slid onto bolt 52' of bolt assembly 50' as thus assembled so that one end of spring 42 engages the cylindrical extension of spring bushing 46 and a second spring bushing is slid onto bolt 52' with its cylindrical extension in the end of spring 42.

Spring assembly 40' and bolt assembly 50' as thus far assembled are next assembled to mounting plate 20 and slide block 30 by inserting bolt 52' through the hole 27 through spring support flange 26 of mounting plate 20 and then threading a nut 58B onto bolt 52'. Bolt 52' is next inserted through bolt hole 37 of second flange 36 of slide block 30 and a further nut 58B is threaded onto the end of bolt 52'. Bolts 58B are advanced toward second flange 36 of slide block 30 to secure bolt 52' therein, e.g., with the longitudinal axis of bolt 52' being generally parallel to the longitudinal sliding direction of slide block 30. As a result, spring 42 is positioned distal to slide block 30 and constrained with its central axis generally parallel to the longitudinal direction of slot 23 for moving and applying force to slide block 30 via second flange 36 thereof.

Bolt 52' has a first nut 58 threaded thereon that may be rotated to advance toward spring 42 and spring flange 26 of mounting plate 20. By rotating nut 58A so that it advances toward spring bushing 46 until it comes into contact therewith, and further advancing of nut 58A will cause slide block 30 to move toward spring support flange 26. With a support for a scraper or other implement through slot 23 of mounting plate 20 and collar 38 of slide block 30, and secured therein by cutting bolts 38*l*, the support will also advance with slide block 30 until the scraper or implement supported thereby encounters the conveyor at which point the support will cease to advance so that spring 42 will be compressed by further advancing nut 58A, thereby to apply a force to slide block 30, the support and the scraper or implement supported thereby, e.g., against the conveyor.

In this manner spring 42 is coupled between mounting plate 20 and slide block 30 in a second configuration for applying a force therebetween by which a scraper or other implement may be pressed against a conveyor with a desired force.

A second nut 58A may then be advanced towards the first nut 58A to engage first nut 58A and lock nut 58A in a desired position on bolt 52' that produces a desired force on the scraper or implement support, thereby to tend to resist the unwanted loosening or tightening of first nut 58A, although any other suitable arrangement for locking nut 58A may be employed.

As the scraper engages a moving conveyor and the splices and other variations in the conveyor cause the support and slide block 30 to move in the longitudinal direction in guides 24 relative to mounting plate 20 which is affixed to structure, and so spring 42 will be compressed and will expand to substantially maintain the desired force, e.g., the force set by advancing nut 58A, for pressing the support and the scraper or other implement thereon towards the conveyor.

A tensioner 10, 10' for applying force to a device to be tensioned, wherein the force applying tensioning device 10, 10' is configurable for applying force in different directions, and the tensioner 10, 10' may comprise: a mounting plate 20 having a pair of substantially parallel guides 24; a slidable member 30 slidable in the pair of parallel guides 24 of mounting plate 20 in a given direction and in a direction substantially opposite to the given direction, the slidable member 30 having a member 38 for receiving a support for a device to be tensioned; a spring 40, 42 for being coupled to mounting plate 20 and to slidable member 30 in different first and second positions, wherein spring 40 urges slidable member 30 in the given direction relative to mounting plate 20 when coupled to mounting plate 20 and to slidable member 30 in the first position and urges slidable member 30 in the direction opposite to the given direction when coupled to mounting plate 20 and to slidable member 30 in the second position. In the first position spring 40, 42 is disposed between a spring support 26 of mounting plate 20 and slidable member 30 and is compressible for tending to push slidable member 30 in the given direction. In the second position the spring support 26 of mounting plate 20 is disposed between spring 40 and slidable member 30 and an end of spring 40 remote from the spring support 26 of mounting plate 20 is connected to slidable member 30, wherein spring 40 is compressible for tending to pull sliding member 30 in the direction opposite to the given direction. In the first position, one end of spring 42 may bear against the spring support 26 of mounting plate 20 and an opposite end of spring 42 may bear against a flange 34 extending from slidable member 30. A locking plate 54 may be disposed between the spring support 26 and spring 42, a spring bushing 44 may be at one end of spring 42, and a threaded member 50, 52 may engage a threaded hole in locking plate 54 and be rotatable relative to locking plate 54 for moving spring bushing 44 further away from and closer to the spring support 26. Tensioner 10, 10' may further comprise a spring bushing 46 disposed at the opposite end of spring 42 and bearing against the flange 34 of slidable member 30. In the second position, one end of spring 42 may bear against a side of the spring support 26 of mounting plate 20 distal slidable member 30 and an opposite end of spring 42 may bear against a first threaded member 50 that extends through spring 42 and spring support 26 to engage a flange 36 extending from slidable member 30. Tensioner 10, 10' may further comprise: a spring bushing 46 at the opposite end of spring 42, and a second threaded member 58A engaging threaded member 50, 52 and bearing against spring bushing 46 and rotatable relative to first threaded member 50, 52 for moving spring bushing 46 further away from and closer to the flange 36 of slidable member 30. Tensioner 10, 10' may further comprise a spring bushing 46 disposed at the one end of spring 42 and bearing against the spring support 26 of mounting plate 20. Tensioner 10, 10' may further comprise a pair of slides 28 disposed between the parallel guides 24 of mounting plate 20 and respective opposing sides of slidable member 30 proximate the parallel guides 24, whereby one slide 28 is between each side of slidable member 30 and one of the parallel guides 24. Mounting plate 20 may comprise: a substantially planar base 22, a pair of L-shaped guide rails 24 attached to base 22 in substantially parallel positions for providing the pair of substantially parallel guides 24 defining a channel in which slidable member 30 is movable, and a U-shaped spring support 26 attached to base 22 with a base of the U-shaped spring support 26 substantially perpendicular to and aligned with the channel. Mounting plate 20 may have an opening 23 therethrough, and the support for a device to be tensioned may be disposable through the opening 23 of mounting plate 20. Slidable member 30 may comprise: a base 32 having substantially parallel opposing edges for sliding in a channel between the pair of substantially parallel guides 24 of mounting plate 20, a collar 38 attached to base 32 for receiving a support for a device to be tensioned therein, a first flange 36 attached near a first end of base 32 and substantially perpendicular to the substantially parallel opposing edges thereof, and a second flange 34 attached near a second end of base 32 and substantially perpendicular to the substantially parallel opposing edges thereof. The first flange 36 may have a hole 37 therethrough and second flange 34 may have a projection 35 extending therefrom. Each of the substantially parallel opposing edges 31 of base 32 may have at least one feature for locating a slide 33 on that opposing edge 31, whereby a slide 33 is disposed on the opposing edge 31 of base 32 between the opposing edge 31 of base 32 and one of the substantially parallel guides 24 of mounting plate 20.

A tensioning device 10, 10' for applying force to a support for a device to be tensioned, wherein the force applying tensioning device 10, 10' is reversible by reassembly for applying force to the support from opposing directions, tensioning device 10, 10' may comprise: a threaded member 50, 52; a mounting plate 20 having an elongated slot 23 therethrough for receiving a support for a device to be tensioned, mounting plate 20 including a first hole 27 for receiving a threaded member 50, 52 in a direction generally parallel to the elongated direction of the slot 23; a guide member 24 associated with mounting plate 20 for receiving a member 30 therein that is slidable generally parallel to the elongated direction of the slot 23; a slidable member 30 including a collar 38 for receiving the support for a scraping device therein, slidable member 30 including a second hole 37 for receiving the threaded member 50, 52 in a direction generally parallel to the elongated direction of the slot 23; wherein slidable member 30 is slidably movable adjacent mounting plate 20 along guide member 24 in a direction generally parallel to the elongated direction of the slot 23, wherein the collar 38 of slidable member 30 is aligned with the slot 23 of mounting plate 20 whereby the support for a scraping device may be received therethrough; and a spring 40, 42 compressible between its first and second ends and having a central axis therebetween; wherein either: threaded member 50, 52 engages the first end of spring 40, 42 and passes through spring 40, 42 generally along the axis thereof to engage the hole 27 of mounting plate 20 for compressing spring 40, 42 between the mounting plate 20 and threaded device 50, 52 for applying force to the support from one direction, or spring 40, 42 is disposed between mounting plate 20 and slidable member 30 and threaded member 50, 52 passes through spring 40, 42 generally along the axis thereof and wherein threaded member 50, 52 engages mounting plate 20 and slidable member 30 for compressing spring 40, 42 between mounting plate 20 and slidable member 30 for applying force to the support from an opposite direction. Mounting plate 20 may comprise: a substantially planar base 22, at least one L-shaped guide rail 24 attached to base 22 in a position defining a channel in which slidable member 30 is slidable thereby providing the guide member, and a U-shaped spring support 26 attached to base 22 with a base of the U-shaped spring support 26 substantially perpendicular to and aligned with the channel and having the first hole 27 therethrough. Slidable member 30 may comprise: a base 32 having substantially parallel opposing edges 31 for sliding in a channel along the guide member 24 of mounting plate 20, wherein collar 38 is attached to base 32, a first flange 36 attached near a first end of base 32 and substantially perpendicular to the substantially parallel opposing edges 31 thereof, and a second flange 34 attached near a second end of base 32 and substantially perpendicular to the substantially parallel opposing edges 31 thereof. First flange 36 may have the second hole 37 therethrough and second flange 34 may have a projection 35 extending therefrom. Each of the substantially parallel opposing edges 31 of base 32 may have at least one feature for locating a slide 33 on that opposing edge 31, whereby the slide 31 is disposed on the opposing edge 31 of base 32 between the opposing edge 31 of base 32 and the guide member 24 of mounting plate 20.

A tensioning device 10, 10' for applying force to a support for a device to be tensioned, wherein the force applying tensioning device 10, 10' is reversible by reassembly for applying force to the support from opposing directions, and tensioning device 10, 10' may comprise: a threaded member 50, 52; a mounting plate 20 having an elongated slot 23 therethrough for receiving a support for a device to be tensioned, the mounting plate 20 including a first hole 27 for receiving the threaded member 50, 52 in a direction generally parallel to the elongated direction of the slot 23; a guide member 24 associated with mounting plate 20 for receiving a member 30 that is slidable generally parallel to the elongated direction of the slot 23; a slidable member 30 slidable along the guide member 24, the slidable member 30 including a collar 38 for receiving the support for a scraping device therein, slidable member 30 including a second hole 37 for receiving the threaded member 50, 52 in a direction generally parallel to the elongated direction of the slot 23; wherein slidable member 30 is slidably movable adjacent mounting plate 20 along guide member 24 in a direction generally parallel to the elongated direction of the slot 23, wherein the collar 38 of slidable member 30 is aligned with the slot 23 of mounting plate 20 whereby the support for a scraping device may be received therethrough; and a spring 40, 42 compressible between its first and second ends and having a central axis therebetween; wherein mounting plate 20, slidable member 30, spring 40, 42 and threaded member 50, 52 are assembleable, i.e. are able to be assembled, so that either: threaded member 50, 52 engages the first end of spring 42 and passes through spring 42 generally along the axis thereof to engage the hole 27 of mounting plate 20 for compressing spring 42 between the mounting plate 20 and threaded member 50, 52 for applying force to slidable member 30 from a first direction, whereby a support received in the collar 38 of slidable member 30 receives force from one direction, or spring 42 is disposed between mounting plate 20 and slidable member 30 and threaded member 50, 52 passes through spring 42 generally along the axis thereof and wherein threaded member 50, 52 engages mounting plate 20 and slidable member 30 for compressing spring 42 between mounting plate 20 and slidable member 30 for applying force to slidable member 30 from a direction opposite the first direction, whereby a support received in the collar 38 of slidable member 30 receives force from the opposite direction. Mounting plate 20 may comprise: a substantially planar base 22, at least one L-shaped guide rail 24 attached to base 22 in a position defining a channel in which slidable member 30 is slidable thereby providing the guide member, and a U-shaped spring support 26 attached to base 22 with a base of the U-shaped spring support 26 substantially perpendicular to and aligned with the channel and having the first hole 27 therethrough. Slidable member 30 may comprise: a base 32 having substantially parallel opposing edges 31 for sliding in a channel along the guide member 24 of mounting plate 20, wherein collar 38 is attached to base 32, a first flange 36 attached near a first end of base 32 and substantially perpendicular to the substantially parallel opposing edges 31 thereof, and a second flange 34 attached near a second end of base 32 and substantially perpendicular to the substantially parallel opposing edges 31 thereof. First flange 36 may have the second hole 37 therethrough and second flange 34 may have a projection 35 extending therefrom. Each of the substantially parallel opposing edges 31 of base 32 may have at least one feature for locating a slide 33 on that opposing edge 31, whereby the slide 31 is disposed on the opposing edge 31 of base 32 between the opposing edge 31 of base 32 and the guide member 24 of mounting plate 20.

While the present invention has been described in terms of the foregoing example embodiments, variations within the scope and spirit of the present invention as defined by the claims following will be apparent to those skilled in the art. For example, while a bolt 52, 52' and nut 58, 58A, 58B may be employed for coupling spring 42 between slide block 30 and mounting plate 20, e.g., spring support flange 26 thereof, any means that so couples spring 42 may be employed. For example, a threaded rod may be employed in place of bolt 52, 52', or a pin or rod having transverse holes into which cotter pins or other pins may be inserted may be employed in place of bolt 52, 52' and nut 58, 58A, 58B. Similarly nuts having inserts that make them self-locking or nuts having holes, notches or other features for receiving locking pins may be employed in place of locking nuts 58, 58A, 58B. Still further, bolt hole 37 of flange 36 of slide block 30 could be threaded thereby to remove the need for at least one nut 58B, and/or the hole of a spring bushing 46 could be threaded to eliminate the need for at least one nut 58A.

By way of further example, while it may be convenient to provide two bolts 52, 52' of different lengths selected for the two different assembly configurations, one bolt suitable for both configurations could be provided. Further, while elements of tensioner 10, 10' may be relatively large and made of steel or other high strength material, e.g., when tensioner 10, 10' is intended for a mine or other heavy duty conveyor, or may be of aluminum or a plastic, e.g., when tensioner 10, 10' is intended for lighter duty uses, such as with a food conveyor, and/or elements may be made by molding or casting.

| ITEMIZED LIST OF TENSIONER PARTS & ITEM NUMBERS | | |
|---|---|---|
| PUSHING CONFIGURATION | | |
| 10 | TENSIONER | |
| 20 | MOUNTING PLATE | |
| | 21 | Mounting Holes |
| | 22 | Base |
| | 23 | Slot, Longitudinal |
| | 24 | Guide Rails (Opposing Pair) |
| | 26 | Spring Support Flange |
| | 27 | Threaded Hole |
| 30 | SLIDE BLOCK | |
| | 32 | Base |
| | 33 | Slide (UHMW Material) |
| | 34 | First Flange (with bump 35) |
| | 36 | Second flange (with hole 37) |
| | 38 | Collar |
| | 381 | Locking Bolt (2 preferred) |
| | 39 | Opening or bore (in collar 38) |
| 40 | SPRING ASSEMBLY | |
| | 42 | Coil Spring |
| | 44 | Pushing Bushing |
| | 46 | Spring Bushing (1, with hole) |
| 50 | BOLT ASSEMBLY | |
| | 52 | Bolt |
| | 54 | Locking Plate |
| | 55 | Threaded Hole |
| | 58 | Nut (1 needed) |

| ITEMIZED LIST OF TENSIONER PARTS & ITEM NUMBERS | | |
|---|---|---|
| PULLING CONFIGURATION | | |
| 10' | TENSIONER | |
| 20 | MOUNTING PLATE | |
| | 21 | Mounting Holes |
| | 22 | Base |
| | 23 | Slot, Longitudinal |
| | 24 | Guide Rails (Opposing Pair) |
| | 26 | Spring Support Flange |
| | 27 | Threaded Hole |
| 30 | SLIDE BLOCK | |
| | 32 | Base |
| | 33 | Slide (UHMW Material) |
| | 34 | First Flange (with bump 35) |
| | 36 | Second flange (with hole 37) |
| | 38 | Collar |
| | 381 | Locking Bolt (2 preferred) |
| | 39 | Opening or bore (in collar 38) |
| 40' | SPRING ASSEMBLY | |
| | 42 | Coil Spring |
| | 44 | Pushing Bushing |
| | 46 | Spring Bushing (2, with hole) |
| 50' | BOLT ASSEMBLY | |
| | 52 | Bolt |
| | 54 | Locking Plate |
| | 55 | Threaded Hole |
| | 58A, 58B | Nut (4 preferred) |

What is claimed is:

1. A tensioner for applying force to a device to be tensioned, wherein the force applying tensioner is configurable for applying force in different directions, said tensioner comprising:

a mounting plate having a base, having a pair of substantially parallel guides on the base defining a sliding channel and having a spring support extending outwardly beyond an end of the base of said mounting plate, wherein a base of said spring support is substantially perpendicular to and aligned with the sliding channel;

a slidable member slidable in the sliding channel defined by said pair of parallel guides of said mounting plate in a given direction and in a direction substantially opposite to the given direction, said slidable member having a member for receiving a support for a device to be tensioned, said slidable member having an outwardly extending projection on a first flange at a first end thereof and an opening in a second flange at a second end thereof;

a first threaded member; and a spring for being coupled to said mounting plate and to the first and second ends of said slidable member in different first and second positions, wherein in the first position:

said spring is disposed between the spring support and said slidable member and is compressible by said first threaded member for tending to push said slidable member in a direction away from said spring support, wherein one end of said spring bears against said first threaded member which is connected to the base of the spring support of said mounting plate for adjusting the force applied to the device to be tensioned and an opposite end of said spring bears against the first flange of said slidable member to engage the projection; and wherein in the second position:

the spring support of said mounting plate is disposed between said spring and said slidable member and an end of said spring remote from the spring support of said mounting plate is connected to said slidable member, wherein said spring is compressible for tending to pull said sliding member in a direction toward said spring support, wherein one end of said spring bears against a side of the base of the spring support of said mounting plate distal said slidable member and an opposite end of said spring bears against said first threaded member which is disposed through said spring and the base of said spring support to engage the opening of the second flange of said slidable member for adjusting the force applied to the device to be tensioned:, wherein said spring urges said slidable member in the given direction relative to said mounting plate when coupled to said mounting plate and to said slidable member in the first position and urges said slidable member in the direction opposite to the given direction when coupled to said mounting plate and to said slidable member in the second position.

2. The tensioner of claim 1 further comprising: in the first position, a locking plate disposed between the spring support and said spring, a spring bushing at the one end of said spring, and a threaded member engaging a threaded hole in said locking plate and rotatable relative to said locking plate for moving said spring bushing further away from and closer to the spring support.

3. The tensioner of claim 1 further comprising: in the first position, a spring bushing disposed at the opposite end of said spring and bearing against the flange of said slidable member.

4. The tensioner of claim 1 further comprising: in the second position, a spring bushing at the opposite end of said spring, and a second threaded member engaging said threaded member and bearing against said spring bushing and rotatable relative to said first threaded member for moving said spring bushing further away from and closer to the flange of said slidable member.

5. The tensioner of claim 1 further comprising: in the second position, a spring bushing disposed at the one end of said spring and bearing against the spring support of said mounting plate.

6. The tensioner of claim 1 further comprising a pair of slides disposed between the parallel guides of said mounting plate and respective opposing sides of said slidable member proximate the parallel guides, whereby one slide is between each side of said slidable member and one of the parallel guides.

7. The tensioner of claim 1 wherein the base of said mounting plate is substantially planar and said mounting plate comprises: a pair of L-shaped guide rails welded to said substantially planar base in substantially parallel positions for providing the pair of substantially parallel guides defining the sliding channel in which said slidable member is movable, and a U-shaped spring support welded to said substantially planar base with a base of the U-shaped spring support substantially perpendicular to and aligned with the channel.

8. The tensioner of claim 1 wherein said mounting plate has an opening therethrough, and wherein the support for a device to be tensioned is disposable through the opening of said mounting plate.

9. The tensioner of claim 8 wherein the opening through said mounting plate is a closed slot.

10. The tensioner of claim 1 wherein said slidable member comprises: a base having substantially parallel opposing edges for sliding in the sliding channel between the pair of substantially parallel guides of said mounting plate, a collar attached to said base for receiving a support for a device to be tensioned therein, wherein the first flange is attached near a first end of said base and is substantially perpendicular to the substantially parallel opposing edges thereof, and wherein the second flange is attached near a second end of said base and is substantially perpendicular to the substantially parallel opposing edges thereof.

11. The tensioner of claim 10 wherein each of the substantially parallel opposing edges of said base has at least one feature for locating a slide on that opposing edge, whereby said slide is disposed on the opposing edge of said base between the opposing edge of said base and one of the substantially parallel guides of said mounting plate.

12. The tensioner of claim 1 further comprising a spring bushing disposed at the first end of said spring, or a spring bushing disposed at the second end of said spring, or spring bushings disposed at each of the first and second ends of said spring.

13. A tensioning device for applying force to a support for a device to be tensioned, wherein the force applying tensioning device is reversible by reassembly for applying force to the support from opposing directions, said tensioning device comprising:

a threaded member;

a mounting plate having an elongated slot therethrough for receiving a support for a device to be tensioned, said mounting plate including a spring support extending beyond an end of said mounting plate and having a first hole therethrough for receiving the threaded member in a direction generally parallel to the elongated direction of the slot;

a guide member associated with said mounting plate for receiving a member that is slidable generally parallel to the elongated direction of the slot;

a slidable member including a collar for receiving the support for a scraping device therein, said slidable member including a first flange having a projection thereon extending outwardly in a direction generally parallel to the elongated direction of the slot and a second flange having a second hole for receiving the threaded member in a direction generally parallel to the elongated direction of the slot;

wherein said slidable member is slidably movable adjacent said mounting plate along said guide member in a direction generally parallel to the elongated direction of the slot, wherein the collar of said slidable member is aligned with the slot of said mounting plate whereby the support for a scraping device may be received therethrough; and a spring compressible between its first and second ends and having a central axis therebetween;

wherein either:

said spring is disposed outwardly of the spring support of said mounting plate and said threaded member engages the first end of said spring and passes through said spring generally along the axis thereof to engage the first hole of said mounting plate for compressing said spring between the spring support of said mounting plate and the distal end of said threaded member for applying force for tending to move said slidable member and the support toward the spring support of said mounting plate, or said spring is disposed between the spring support of said mounting plate and said slidable member and said threaded member engages the first end of said spring and the second end of said spring engages the projection of the first flange of said slidable member for compressing said spring between said threaded member and said slidable member for tending to move said slidable member and the support away from the spring support of said mounting plate.

14. The tensioning device of claim 13 wherein said mounting plate comprises: a substantially planar base, at least one L-shaped guide rail attached to said base in a position defining a channel in which said slidable member is slidable thereby providing the guide member, and wherein said spring support includes a U-shaped spring support attached to said base with a base of the U-shaped spring support extending beyond the end of said mounting plate substantially perpendicular to and aligned with the channel and having the first hole therethrough.

15. The tensioning device of claim 13 wherein said slidable member comprises: a base having substantially parallel opposing edges for sliding in a channel along the guide member of said mounting plate, wherein said collar is attached to said base, wherein the first flange is attached near a first end of said base and is substantially perpendicular to the substantially parallel opposing edges thereof, and wherein the second flange is attached near a second end of said base and is substantially perpendicular to the substantially parallel opposing edges thereof.

16. The tensioning device of claim 15 wherein each of the substantially parallel opposing edges of said base has at least one feature for locating a slide on that opposing edge, whereby the slide is disposed on the opposing edge of said base between the opposing edge of said base and the guide member of said mounting plate.

17. The tensioning device of claim 13 wherein the elongated slot through said mounting plate is a closed slot.

18. The tensioning device of claim 13 further comprising a spring bushing disposed at the first end of said spring, or a spring bushing disposed at the second end of said spring, or spring bushings disposed at each of the first and second ends of said spring.

19. A tensioning device for applying force to a support for a scraping device to be tensioned, wherein the force applying tensioning device is reversible by reassembly for applying force to the support for a scraping device from opposing directions, said tensioning device comprising:
 a threaded member;
 a mounting plate having an elongated slot therethrough for receiving a support for a scraping device to be tensioned, said mounting plate including a spring support extending beyond an end of said mounting plate and having a first hole therethrough for receiving the threaded member in a direction generally parallel to the elongated direction of the slot;
 a guide member associated with said mounting plate for receiving a member that is slidable generally parallel to the elongated direction of the slot;
 a slidable member slidable along the guide member, said slidable member including a collar for receiving the support for a scraping device therein, said slidable member including a first flange having a projection thereon extending outwardly in a direction generally parallel to the elongated direction of the slot and a second flange having a second hole for receiving the threaded member in a direction generally parallel to the elongated direction of the slot;
 wherein said slidable member is slidably movable adjacent said mounting plate along said guide member in a direction generally parallel to the elongated direction of the slot,
 wherein the collar of said slidable member is aligned with the slot of said mounting plate whereby the support for a scraping device may be received therethrough; and
 a helical spring compressible between its first and second ends and having a central axis therebetween;
 wherein said mounting plate, said slidable member, said helical spring and said threaded member are assembleable so that either:
  in a first arrangement, said helical spring is disposed entirely outwardly of the spring support of said mounting plate and said threaded member engages the first end of said helical spring and passes through said helical spring generally along the axis thereof to engage the first hole of said mounting plate for compressing said helical spring between the spring support of said mounting plate and the distal end of said threaded member for applying force for tending to move said slidable member and the support for a scraping device toward the spring support of said mounting plate, or
  in a second arrangement, said helical spring is disposed between the spring support of said mounting plate and said slidable member and said threaded member engages the first end of said helical spring and the second end of said spring engages the projection of the first flange of said slidable member for compressing said helical spring between said threaded member and said slidable member for tending to move said slidable member and the support for a scraping device away from the spring support of said mounting plate.

20. The tensioning device of claim 19 wherein said mounting plate comprises: a substantially planar base, at least one L-shaped guide rail attached to said base in a position defining a channel in which said slidable member is slidable thereby providing the guide member, and wherein said spring support includes a U-shaped spring support attached to said base with a base of the U-shaped spring support extending beyond the end of said mounting plate substantially perpendicular to and aligned with the channel and having the first hole therethrough.

21. The tensioning device of claim 19 wherein said slidable member comprises: a base having substantially parallel opposing edges for sliding in a channel along the guide member of said mounting plate, wherein said collar is attached to said base, wherein the first flange is attached near a first end of said base and is substantially perpendicular to the substantially parallel opposing edges thereof, and wherein the second flange is attached near a second end of said base and is substantially perpendicular to the substantially parallel opposing edges thereof.

22. The tensioning device of claim 21 wherein each of the substantially parallel opposing edges of said base has at least one feature for locating a slide on that opposing edge, whereby the slide is disposed on the opposing edge of said base between the opposing edge of said base and the guide member of said mounting plate.

23. The tensioning device of claim 19 wherein the elongated slot through said mounting plate is a closed slot.

24. The tensioning device of claim 19 further comprising a spring bushing disposed at the first end of said spring, or a spring bushing disposed at the second end of said spring, or spring bushings disposed at each of the first and second ends of said spring.

* * * * *